United States Patent [19]

Bonnell et al.

[11] Patent Number: 5,655,081
[45] Date of Patent: Aug. 5, 1997

[54] SYSTEM FOR MONITORING AND MANAGING COMPUTER RESOURCES AND APPLICATIONS ACROSS A DISTRIBUTED COMPUTING ENVIRONMENT USING AN INTELLIGENT AUTONOMOUS AGENT ARCHITECTURE

[75] Inventors: David N. Bonnell, Houston; Kirill L. Tatarinov; Martin W. Picard, both of Bellaire, all of Tex.

[73] Assignee: BMC Software, Inc., Houston, Tex.

[21] Appl. No.: 400,850

[22] Filed: Mar. 8, 1995

[51] Int. Cl.⁶ .................. G06F 12/08; G06F 13/14
[52] U.S. Cl. .......... 395/200.32; 395/292; 395/200.53; 364/DIG. 1; 364/DIG. 2
[58] Field of Search .................. 395/800, 187.01, 395/700, 650, 182.02, 115, 146, 166, 150, 200.01, 500, 733, 200.03, 292, 200.06, 200.15, 200.16; 364/DIG. 1, DIG. 2; 340/825.31; 370/95.1, 54

[56] References Cited

U.S. PATENT DOCUMENTS

| | | | |
|---|---|---|---|
| 4,924,378 | 5/1990 | Hershey et al. | 395/187.01 |
| 5,079,695 | 1/1992 | Dysart et al. | 395/700 |
| 5,167,035 | 11/1992 | Mann et al. | 395/182.02 |
| 5,432,935 | 7/1995 | Kato et al. | 395/700 |
| 5,440,744 | 8/1995 | Jacobson et al. | 395/650 |

*Primary Examiner*—Daniel H. Pan
*Attorney, Agent, or Firm*—Vinson & Elkins L.L.P.

[57] ABSTRACT

A method and apparatus are disclosed for monitoring and managing the applications and resources on a distributed computer network. Preferably, at least one manager software system runs on at least one of the networked computer systems designated as a network management computer system or "console" system. An agent software system runs on each of the server computer systems in the network to be monitored. Each respective agent software system carries out tasks on the computer system in which it is installed such as discovering which resources and applications are present on the computer system, monitoring particular aspects of the resources and applications present on the computer system, and executing recovery actions automatically when such actions are warranted. The agents are capable of intelligent, autonomous operation. Knowledge modules are stored in a non-volatile storage device at the site of each agent software system and are loaded and unloaded into server memory dynamically as consoles register and de-register with the agents. Consoles may register to receive all information from the agents or only selected information. An event management procedure is disclosed for coordinating event management between the various consoles throughout the network.

27 Claims, 22 Drawing Sheets

FIG. 4

| | |
|---|---|
| 82 | INFORMATION APPLICABLE TO ALL CLASSES OF COMPUTERS<br>· ENVIRONMENT    · COMMANDS<br>· PARAMETER     · SETUP COMMANDS<br>· COMMAND TYPES  · INFOBOX COMMANDS |

(38)

92 {

| 84 | INFORMATION APPLICABLE TO COMPUTER CLASS 1<br>· ENVIRONMENT<br>· PARAMETERS<br>· COMMAND TYPES<br>· COMMANDS<br>· SETUP COMMANDS<br>· INFOBOX COMMANDS | ○ ○ ○ | INFORMATION APPLICABLE TO COMPUTER CLASS 'n'<br>· ENVIRONMENT<br>· PARAMETERS<br>· COMMAND TYPES<br>· COMMANDS<br>· SETUP COMMANDS<br>· INFOBOX COMMANDS |
|---|---|---|---|

| 86 | INFORMATION APPLICABLE TO COMPUTER INSTANCE 1 IN CLASS 1<br>· ENVIRONMENT<br>· PARAMETERS<br>· COMMANDS<br>· INFOBOX COMMANDS | ○ ○ ○ | INFORMATION APPLICABLE TO COMPUTER INSTANCE 'n' IN CLASS 1<br>· ENVIRONMENT<br>· PARAMETERS<br>· COMMANDS<br>· INFOBOX COMMANDS | ○ ○ ○ | INFORMATION APPLICABLE TO COMPUTER INSTANCE 1 IN CLASS 'n'<br>· ENVIRONMENT<br>· PARAMETERS<br>· COMMANDS<br>· INFOBOX COMMANDS | ○ ○ ○ | INFORMATION APPLICABLE TO COMPUTER INSTANCE 'n' IN CLASS 'n'<br>· ENVIRONMENT<br>· PARAMETERS<br>· COMMANDS<br>· INFOBOX COMMANDS |
|---|---|---|---|---|---|---|---|

94 {

| 88 | INFORMATION APPLICABLE TO APPLICATION CLASS 1<br>· ENVIRONMENT<br>· PARAMETERS<br>· COMMAND TYPES<br>· COMMANDS<br>· INFOBOX COMMANDS<br>· DISCOVERY | ○ ○ ○ | INFORMATION APPLICABLE TO APPLICATION CLASS 'n'<br>· ENVIRONMENT<br>· PARAMETERS<br>· COMMAND TYPES<br>· COMMANDS<br>· INFOBOX COMMANDS<br>· DISCOVERY |
|---|---|---|---|

| 90 | INFORMATION APPLICABLE TO APPLICATION INSTANCE 1 IN CLASS 1<br>· ENVIRONMENT<br>· PARAMETERS<br>· COMMANDS | ○ ○ ○ | INFORMATION APPLICABLE TO APPLICATION INSTANCE 'n' IN CLASS 1<br>· ENVIRONMENT<br>· PARAMETERS<br>· COMMANDS | ○ ○ ○ | INFORMATION APPLICABLE TO APPLICATION INSTANCE 1 IN CLASS 'n'<br>· ENVIRONMENT<br>· PARAMETERS<br>· COMMANDS | ○ ○ ○ | INFORMATION APPLICABLE TO APPLICATION INSTANCE 'n' IN CLASS 'n'<br>· ENVIRONMENT<br>· PARAMETERS<br>· COMMANDS |
|---|---|---|---|---|---|---|---|

```
!PATROLV2.0.21    3973F830585795A8
!++
!
! PATROL Session Knowledge Module
!
!--
VERSION2
COMPUTERS = {
    { NAME = "ALL_COMPUTERS",
        COMMANDS = {
            { NAME = "Login",
                AVAILABILITY = AVAILABLE_ONLINE,
                SECURITY = SECURITY_INHERIT,
                BASE_COMMAND = {
                    { COMPUTER_TYPE = "ALL_COMPUTERS",
                        COMMAND_TYPE = "OS",
                        COMMAND_TEXT = 769753920 "%{/terminalEmulator} -sl 500 -sb -n %{/ho
                    }
                }
            }
        },
        INFO_BOX = {
            { NAME = "Ip Address",
                AVAILABILITY = AVAILABLE_ONLINE,
                SECURITY = SECURITY_INHERIT,
                BASE_COMMAND = {
                    { COMPUTER_TYPE = "ALL_COMPUTERS",
                        COMMAND_TYPE = "OS",
                        COMMAND_TEXT = 759992599 "%ECHO %{/ipAddress}"
                    }
                }
            }
        },
        SETUP = {
            { NAME = "Terminal Emulater",
                AVAILABILITY = AVAILABLE_ALWAYS,
                SECURITY = SECURITY_INHERIT,
                BASE_COMMAND = {
                    { COMPUTER_TYPE = "ALL_COMPUTERS",
                        COMMAND_TYPE = "PSL",
                        COMMAND_TEXT = 759992599 "set (\"/terminalEmulator\", \"xterm\");"
                    },
                    { COMPUTER_TYPE = "ULTRIX",
                        COMMAND_TYPE = "PSL",
                        COMMAND_TEXT = 759992599 "set (\"terminalEmulator\", \"dxterm\");"
                    }
                }
            }
        },
        ENVIRONMENT = { "PATH" = "/bin:/usr/bin:/etc:/usr/etc:/usr/ucb:/usr/bsd/quota:/usr/sl
        PARAMETERS = {
            { NAME = "PrinterDiscovery",
                PARAM_TYPE = STANDARD,
                ACTIVE = True,
                MONITOR = False,
                CHECK = False,
                BASE_COMMAND = {
                    { COMPUTER_TYPE = "ALL_COMPUTERS",
                        COMMAND_TYPE = "PSL",
                        COMMAND_TEXT = 766297889 "set (\"/prnDiscoveryPollTime\", 300);"
                    }
                },
                START = "ASAP",
                EXECUTION = "1",
```

```
        } NAME = "CPU Utilization",
          AVAILABILITY = AVAILABLE_ONLINE,
          SECURITY = SECURITY_INHERIT,
          BASE_COMMAND = {
                { COMPUTER_TYPE = "ALL_COMPUTERS",
                  COMMAND_TYPE = "PSL",
                  COMMAND_TEXT = LOAD "cpu_trend_analysis.psl"
                }
          },
          TASK = {
                SHOW_TIMER = TRUE,
                INTERACTIVE = FALSE,
                ATTN_POPUP = TRUE
            }
          }
        }
      },
      INFO_BOX = {
        { NAME = "System Load",
          AVAILABILITY = AVAILABLE_ONLINE,
          SECURITY = SECURITY_INHERIT,
          BASE_COMMAND = {
                { COMPUTER_TYPE = "ALL_COMPUTERS",
                  COMMAND_TYPE = "PSL",
                  COMMAND_TEXT = 759992618 "print (get (\"/SYSTEM/SYSTEM/uptLoad\"))
                }
          }
        }
      },
      PARAMETERS = {
        { NAME = "USRPROCColl",
          PARAM_TYPE = COLLECTOR,
          ACTIVE = True,
          MONITOR = False,
          CHECK = False,
          BASE_COMMAND = {
                { COMPUTER_TYPE = "ALL_COMPUTERS",
                  COMMAND_TYPE = "PSL",
                  COMMAND_TEXT = LOAD "usr_proc_collector.psl"
                }
          },
          START = "ASAP",
          POLL_TIME = "600",
          EXTERNAL_POLLING = False
        }
      }
    }
  }
}
```

```
# PSL Serial No.: 765773959
# usr_proc_collector.psl

# Copyright 1993-94 Patrol Software, Inc. as an unpublished licensed work.
# Copyright 1994 BMC Software, Inc. as an unpublished licensed work.

# The source code created in 1994, is a trade secret which is the property
# of BMC Software, Inc. All use, disclosure, and/or reproduction not specifically
# authorized by BMC Software, Inc., is prohibited.

# This program may also be protected under the copyright and trade secret laws
# of non-U.S. countries. All right reserved.

# Copyright (c) 1993, 1994 Patrol Software
# Copyright (c) 1994 BMC Software, Inc.

# File        : usr_proc_collector.psl
# Author      : H Kusumo
# Platform    : ALL
# Description : The script retrieve user information and
#               process information from who and psl process
#               function. This script calculate number of user
#               login, session, process, as well as average
#               process per user
# History
# ----------------------------------------------------------

# ----------------------------------------------------------

ZOMBIE = "<defunct>";

# get machine type
machine_type = get ("/appType");

cmd = "who";

# execute user info command
buf = system (cmd);

# check if buffer is empty or command not found
if (buf == " ") {
    exit;
}
elsif (index (buf, "not found")){
        print ("SYSTEM:SYSTEM:USRColl: Warning environment is not set properly, switch to sil
        exit;
}
no_session = 0;
# process user information
no_user = 0;
user_list = " ";
foreach entry (buf){
        # get user name
        name = ntharg (entry, 1);

# check if it is root, ignore it
        if (name != "root"){
            no_session ++;

# check if this user is not in the user list
            if (!index (user_list, name)){
                    user_list = user_list . name . "\n";
                    no_user ++;
```

```
            }
         }
    }
} process process information
process_info = process ("*");
no_process = 0;
no_user_process = 0;
no_zombie_process = 0;

foreach entry (process_info){
        # check if this is zombie process
        if (index (entry, ZOMBIE)){
                no_zombie_process ++;
        } if (ntharg (entry, 3) != "root"){
                no_user_process ++;
        }
        no_process ++;
} calculate average user process
if ((no_user !=0 && (no_user_process !=0)){
        avg_usr_proc = int (no_user_process / no_user);
}
else{
        exit;
} set global variables
set ("/SYSTEM/SYSTEM/usrNoUser", no_user);
set ("/SYSTEM/SYSTEM/usrNoSession", no_session);
set ("/SYSTEM/SYSTEM/usrAvgUsrProc", avg_usr_proc);
set ("/SYSTEM/SYSTEM/procNumProcs", no_process);
set ("/SYSTEM/SYSTEM/procUserProcs", no_user_process);
set ("/SYSTEM/SYSTEM/procNoZombieProcess", no_zombie_process);

# get global parameters
if (exists ("/USERS/USERS")){
        set ("/USERS/USERS/USRNoUser/value", no_user);
        set ("/USERS/USERS/USRNoSession/value", no_session);
        set ("/USERS/USERS/USRUserProcs/value", no_user_process);
        set ("/USERS/USERS/USRAvgUsrProc/value", avg_usr_proc);
} if (exists "/SYSTEM/SYSTEM")){
        set ("/SYSTEM/SYSTEM/SYSNoUser/value", no_user);
        set ("/SYSTEM/SYSTEM/SYSNumProcs/value", no_process);
        set ("/SYSTEM/SYSTEM/SYSAvgUsrProc/value", avg_usr_proc);
} if (exists ("/PROCESS/PROCESS")){
        set ("/PROCESS/PROCESS/PROCNumProcs/value", no_process);
}
```

| PARAMETER IDENTIFICATION | MEASUREMENT TIME | VALUE |
|---|---|---|
| DATA REPOSITORY ||| 
| | | |
| | | |
| ∘ ∘ ∘ | ∘ ∘ ∘ | ∘ ∘ ∘ |
| | | |
| | | |

FIG. 15

EVENT REPOSITORY — 206

| CATALOG NUMBER 226 | ENTRY NUMBER 228 | EVENT ARGUMENTS 230 | EVENT STATUS 232 | EVENT TIME 234 | EVENT DIARY 236 | EVENT OWNER 238 |
|---|---|---|---|---|---|---|
| ... | ... | ... | ... | ... | ... | ... |
| | | | | | | |
| | | | | | | |

EVENT CATALOG 1 — 220

| ENTRY NUMBER | EVENT DESCRIPTION |
|---|---|
| ... | ... |
| | |
| | |

EVENT CATALOG 2 — 222

| ENTRY NUMBER | EVENT DESCRIPTION |
|---|---|
| ... | ... |
| | |
| | |

EVENT CATALOG n — 224

| ENTRY NUMBER | EVENT DESCRIPTION |
|---|---|
| ... | ... |
| | |
| | |

FIG. 17

TABLE OF REGISTERED CONSOLES (250)

| ENTRY NUMBER (252) | ADDRESS AND OTHER INFORMATION IDENTIFYING CONSOLE (254) | POINTER TO EVENT CONTEXT FOR CONSOLE (256) |
|---|---|---|
| 0 | CONSOLE A | CONTEXT A |
| 1 | CONSOLE B | CONTEXT B |
| 2 | CONSOLE C | CONTEXT C |
| 3 | 258 | 260 |
| ⋮ | ⋮ | ⋮ |
| n−1 | | |
| n | | |

FIG. 19

CONSOLE SENDS MESSAGE TO AGENT IDENTIFYING THE CONSOLE — 296

↓

AGENT SENDS MESSAGE TO CONSOLE IDENTIFYING THE AGENT — 298

↓

CONSOLE SENDS REGISTRATION MESSAGE TO AGENT INDICATING WHICH RESOURCES IT DESIRES TO RECEIVE INFORMATION ABOUT. MESSAGE MAY CONTAIN A LIST OF:
- APPLICATION CLASSES
- - APPLICATION INSTANCES
- - - PARAMETERS

MESSAGE MAY ALSO CONTAIN EVENT FILTERS FOR THIS CONSOLE — 300

↓

AGENT STORES INFORMATION RECEIVED IN REGISTRATION MESSAGE AND ASSOCIATES IT WITH CONSOLE IDENTIFIER — 302

↓

AGENT CREATES A LIST OF KNOWLEDGE MODULES CORRESPONDING TO RESOURCES IDENTIFIED IN REGISTRATION MESSAGE — 304

↓

AGENT CHECKS TO SEE WHICH CORRESPONDING KNOWLEDGE MODULES HAVE ALREADY BEEN LOADED, AND LOADS ONLY THOSE NEEDED BUT NOT ALREADY PRESENT IN MEMORY — 306

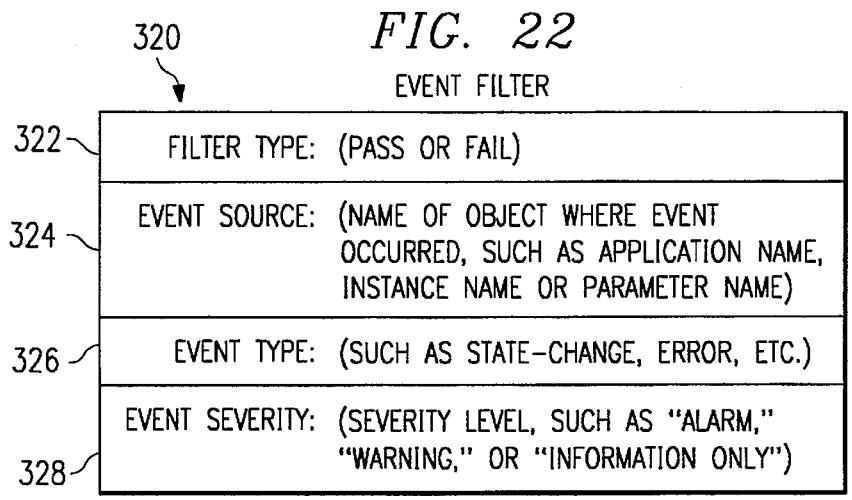
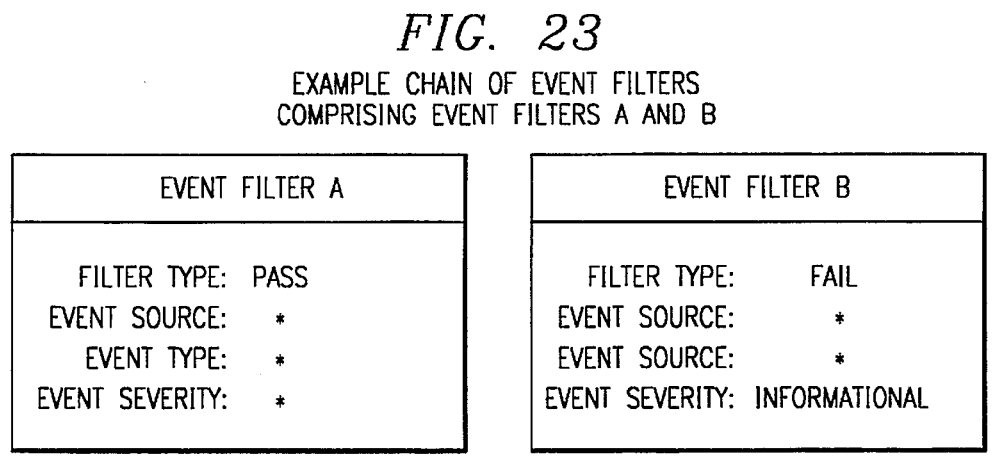
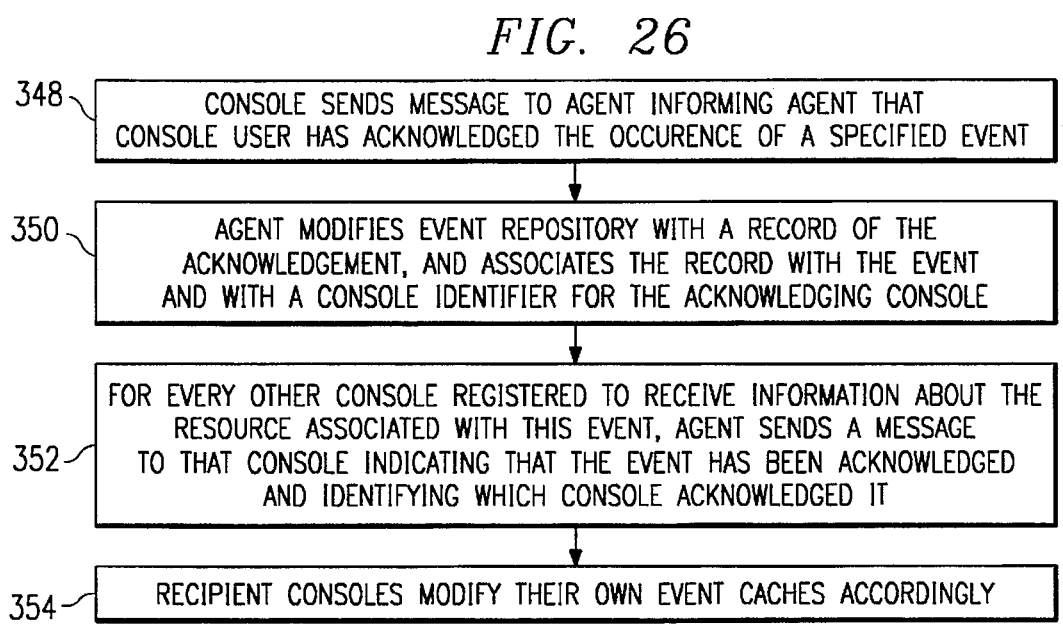

FIG. 25

EVENT PROCESSING ROUTINE

LOG THE EVENT INTO THE EVENT REPOSITORY

FOR EVERY CONSOLE REGISTERED...

{ • ACCESS THE INTEREST MASK ASSOCIATED WITH THE OBJECT ORIGINATING THE EVENT (WHETHER IT BE THE APPLICATION INTEREST MASK, THE INSTANCE INTEREST MASK, OR THE PARAMETER INTEREST MASK).

• IF THE INTEREST MASK INDICATES THAT THIS CONSOLE IS INTERESTED IN THE EVENT, THEN...

— ACCESS THE EVENT CONTEXT FOR THIS CONSOLE
— FOR EVERY EVENT FILER IN THE EVENT CHAIN...

{ ▫ IF [THE EVENT DOES NOT SATISFY THE EVENT SOURCE, EVENT TYPE AND EVENT SEVERITY CONDITIONS LISTED IN THE EVENT FILTER] AND [THE EVENT FILTER IS A "PASS" TYPE FILTER], THEN REJECT THE EVENT AND DO NOT SEND A NOTIFICATION TO THE CONSOLE (EXIT THIS "FOR-NEXT" LOOP AND CONTINUE WITH "NEXT REGISTERED CONSOLE").

▫ ELSE IF [THE EVENT DOES SATISFY THE EVENT SOURCE, EVENT TYPE AND EVENT SEVERITY CONDITIONS LISTED IN THE EVENT FILTER] AND [THE EVENT FILTER IS A "FAIL" TYPE FILTER], THEN REJECT THE EVENT AND DO NOT SEND A NOTIFICATION TO THE CONSOLE (EXIT THIS "FOR-NEXT" LOOP AND CONTINUE WITH "NEXT REGISTERED CONSOLE").

{ NEXT EVENT FILTER
— SEND NOTIFICATION OF EVENT TO THE CONSOLE

{ NEXT REGISTERED CONSOLE

SYSTEM FOR MONITORING AND MANAGING COMPUTER RESOURCES AND APPLICATIONS ACROSS A DISTRIBUTED COMPUTING ENVIRONMENT USING AN INTELLIGENT AUTONOMOUS AGENT ARCHITECTURE

FIELD OF THE INVENTION

This invention relates generally to computer networks. More specifically, the invention relates to a method and apparatus for centrally monitoring and managing the computers, applications and other resources present in a distributed computing environment.

BACKGROUND

The data processing resources of business organizations are increasingly taking the form of a distributed computing environment in which data and processing are dispersed over a network comprising many interconnected, heterogeneous and geographically remote computers. Among the reasons for this approach are to offload non-mission-critical processing from the mainframe, to provide a pragmatic alternative to centralized corporate databases, to establish a single computing environment, to move control into the operating divisions of the company, and to avoid having a single point of failure. For example, many business entities have one client/server network installed in each regional office, in which a high-capacity computer system operates as the "server" supporting many lower-capacity "client" desk-top computers. The servers in such a business entity are also commonly connected to one another by a higher-level network known as a wide area network. In this manner, users at any location within the business entity can theoretically access resources available in the company's network regardless of where the resource is located.

The flexibility gained for users with this type of arrangement comes with a price, however. It is very difficult to manage such a diverse and widely-dispersed network for many reasons. Servers installed in the wide area network are frequently not all of the same variety. One regional office may be using an IBM machine with a UNIX operating system, while another regional office may be using a DEC machine with a VMS operating system. Also, applications present on the servers throughout the network vary not only in terms of type, but also product release level within an application type. Moreover, the applications available are changed frequently by users throughout the network, and failure events in such a network are usually difficult to catch until after a failure has already occurred. Thus, a need exists for an efficient and flexible enterprise management system.

By way of background, one computer network management system was implemented in the fashion shown schematically in FIG. 1. In FIG. 1, a network management computer system 10 is coupled via network 12 to server computer system 14 and a plurality of other server computer systems. The hardware present in each of the computer systems may be of any conventional type such as is typically found on server computers in a client/server network environment. Moreover, the hardware configuration of each of the computer systems need not be the same. For example, network management computer system 10 might be built around a computer sold by International Business Machines Corporation operating with the well-known UNIX operating system, while server computer system 14 might be built around a computer sold by Digital Equipment Corporation operating with the well-known VMS operating system. The other server computer systems in the network might be built around yet other hardware/software platforms. In addition, all of the server computers in the network might be coupled to a variety of supported client computers such as desk-top computers, workstations and other resources. It is anticipated, however, in FIG. 1 that network management computer system 10 and each of the server computer systems in the network will be equipped with some sort of CPU 16, 18, some sort of conventional input/output equipment 20, 22 such as a keyboard and a display monitor, some sort of conventional data storage device 24, 26 such as a disk or tape drive or CD ROM drive, some sort of random access memory ("RAM") 28, 29, and some sort of conventional network communication hardware 30, 32 such as an ETHERNET interface unit for physically coupling the computer system to network 12. In the system of FI6. 1, network 12 may be implemented using any conventional network protocol such as TCP/IP. In the configuration shown in FIG. 1, a manager software system 34 is stored on storage device 24 in network management computer system 10; one agent software system is installed on each of the server computer systems in the network, such as agent software system 36 shown stored on storage device 26 in server computer system 14; at least one knowledge module 38 is stored on storage device 24 in network management computer system 10; and at least one script program 40, 42 is stored on each of the storage devices 24, 26 throughout the computer network.

FIG. 2 illustrates the main components for implementing the manager software system 34 shown in the system of FIG. 1. Knowledge module parser 44 is responsible for accessing knowledge module 38 and parsing the information therein for use by knowledge database manager 46, which in turn creates and maintains a database 47 of knowledge that is more readily useable by manager software system 34 than would be the data stored in knowledge module 38. Object database manager 48 creates and maintains a database 49 representing all of the resources and applications (collectively, "objects") present on the computer network, as well as information pertaining to the state of those objects, in a form that will be readily useable by a graphical user interface module 50. Databases 47 and 49 may be stored in RAM or on a storage device such as a hard disk. Graphical user interface 50 is responsible for communicating with display driver software in order to present visual representations of objects on the display of network management computer system 10. Such representations typically take the form of icons for objects. Also, graphical user interface module 50 coordinates the representation of pop-up windows for command menus and the display of requested or monitored data. Event manager 52 is responsible for keeping a record of various occurrences throughout the computer network, such as the occurrence of alarm conditions and their resolution, for the purpose of record keeping and management convenience. Interface 54 is for the purpose of interfacing with network management software other than the manager software system 34 and agent software system 36. For example, users of network management computer system 10 may make use of software such as Hewlett Packard Corporation's OPENVIEW product for the purpose of monitoring low-level network conditions such as broken physical connections. While using such a third-party product, the user may open a window and request information from manager software system 34, in which case interface 54 will coordinate communication between manager software system 34 and such third party product. Communications module 56 is responsible for handling all communications to and from agent software systems installed throughout the computer network. Script program compiler 58 is used when the user of manager software system 34 wishes to develop script programs for use in customizing the network management system. Kernel 60 represents all other miscellaneous functions within manager software system 34, such as coordinating the action of the above-named modules and the communications between them.

FIG. 3 illustrates the main components of the agent software system 36 shown in FIG. 1. Communications module 62 coordinates message communications to and from other computers, such as network management computer system 10, and parses the information contained in such messages. Script program compiler 64 is responsible for compiling script programs. Such compilation is only partial, however, resulting in an intermediate code that is not directly executable, but that is interpretable by script program interpreter 66. Command execution manager 68 is responsible for coordinating the execution of commands dictated from within agent software system 36 by any of its components. Depending on the command type, executions of such commands may entail the use of operating system commands available on the host server computer, or such commands may entail the interpretation of script programs as will be further described below. Run queue scheduler 70 maintains a list of runable jobs or commands, together with the times at which they should be run and their desired frequency. By checking a timer within agent software system 36, run queue scheduler 70 is capable of "waking up" at appropriate times to route runable jobs or commands to command execution manager 68. Dispatcher 72 is responsible for routing information to and from the appropriate modules within agent software system 36, and generally performs a coordinating function similar in nature to that of kernel 60 in manager software system 34. Knowledge database manager 74 creates and maintains a database 75, either in RAM or on a storage device such as a hard disk, containing knowledge received via messages from manager software system 34. The knowledge maintained in agent's database 75 differs from the knowledge contained in manager's database 47, however, in that agent's database 75 typically does not contain information pertinent to the display of information on the manager's console. Process cache manager 76 creates and maintains process cache 77, which is typically stored in RAM. Agent software system 36 fills process cache 77 periodically with information concerning the processes that are present on the host server computer at any given moment. Process cache 77 is also accessed by other modules within agent software system 36, such as application discovery manager 78, for providing some of the input information used to determine whether certain resources are present on the host server. Parameter and recovery action manager 80 is responsible for monitoring certain aspects of resources on the server computer, such as "disk space remaining," for example, and is responsible for taking automatic actions to recover from alarm levels for such resources, as will be discussed below.

FIG. 4 is a diagrammatic illustration of the types of information that is typically stored in a knowledge module 38 and in knowledge databases such as databases 47 and 75. (Note that knowledge module 38 is usually stored in the form of a data file containing ASCII text.) There are two basic broad categories of information represented in a knowledge module. Category 92 comprises information related to computers that may be present on any given network. Category 92 includes information in categories 82, 84 and 86. Category 94 comprises information related to applications that might be present on the computers in any given network. Category 94 includes information in categories 88 and 90. As can be seen in categories 82 and 88, various types of information may be stored in a knowledge module, such as information relating to environment, parameters, command types, commands, setup commands, "infobox" commands, and discovery. For example, environment information includes values for environment variables that are used to execute certain commands. Parameter information pertains to certain aspects of a computer or application that are to be monitored, such as "number of users logged in." "Command type" information tells an agent software system how to execute a given command. ("Command type" information might indicate that a given command is type "operating system," or type SQL, or that the command is actually a script program.) "Command" information, proper, is associated with the definition of a command, i.e., the text of the actual command, and contains information displayed in a command menu at the network manager's console. Setup commands are those that are to be executed whenever the manager software system 10 establishes a connection with an agent software system 36. Infobox command information relates to the format for displaying command output in "pop-up" information windows at the manager's console. Discovery information relates to which application classes are desired to be searched for, and also to the names and locations of the script programs required to do the searching.

Note that, in knowledge module 38, the above categories of information are arranged in a hierarchy, such that information in category 82 will apply to all computers (for example, IBM and DEC computers), unless overridden by information in category 84 or 86. By the same token, information in category 84 would apply to all instances of a given class of computers (for example, all computers using the UNIX operating system), unless overridden by information in category 86. Information in category 86 would apply only to certain instances of computers in a given class. (For example, the UNIX computers at the Dallas and Houston nodes in a wide area network would represent two different instances within the UNIX computer class.) Similarly, categories 88 and 90 represent a hierarchy of infomation: Information in category 88 would apply to all applications in a given class of applications, unless overridden by information in category 90 pertaining to a specific application instance within the class. (For example, one application class might contain information relating to all instances of version 7 of Oracle Corporation's ORACLE database management system, while another class might contain information relating to all instances of version 6 of that company's database management system.) Information in category 90 would apply only to certain instances of the applications in a class, for example the ORACLE version 7 database present on a certain server computer system within the network.

It should be noted that, in the network management system of FIG. 1, only information types pertinent to a particular server are sent by management software system 10 to the agent software system 36 installed on that server, but such pertinent information might include infomation from all of the above categories.

FIG. 5a, which is continued in FIG. 5b, is an excerpt from an actual knowledge module 38. FIG. 6a, which is continued in FIG. 6b, is an excerpt from an actual script program such as would be typical for script programs 40 and 42. Script programs are written in an interpretable language. In the network management system of FIG. 1, script programs are stored in network management computer system 10 and server computer system 14 in their uninterpreted form, usually in the form of an ASCII text file. In the network management system of FIG. 1, when a script program 42 is used for the first time by agent software system 14, it is compiled and interpreted. Thereafter, the compiled version of script program 42 is stored so that the next time it is required it may simply be interpreted from its intermediate form rather than being compiled again. As can be seen from the example, a script program written in an interpretable language can be used to define a command or routine, such as (in this example) a routine for collecting information and determining the number of users logged into a particular server computer system 14 as well as the number of processes per user. Any highlevel language definition could be used to write the script programs for use in the system of FIG. 1, provided that the language definition enabled the programmer to: (1) execute external commands, (2) access system files, (3) communicate information about the existence and status of resources, (4) allow the exchange of information between processes, and (5) query and update a knowledge database such as databases 47 and 75.

FIG. 7 is a flow diagram showing how the network management system of FIG. 1 was initialized; FIG. 8 is a flow diagram illustrating how the network management system of FIG. 1 was used to discover resources on a server computer system; FIG. 9 is a flow diagram illustrating how the network management system of FIG. 1 was used to monitor resources on a server computer system; and FIG. 10 is a flow diagram illustrating how the network management system of FIG. 1 was used to execute recovery actions relating to the resources on a server computer system.

While the above-described network management system successfully addressed numerous important problems in the art, it did not address certain other problems. One such problem is that of scalability. It is desirable in a large network to use numerous network management computer systems 10, each running its own manager software 34 or "console" process, and to have agent processes in the network numbering in the thousands. In network systems like that shown in FIG. 1, however, a separate agent process is required in server computer system 14 with its own knowledge database 75 each time a new manager software process or "console" process begins to monitor the resources on server computer system 14. Therefore, multiple agents would exist on the same server in order to support multiple consoles. This soon begins to tax the memory and CPU resources of server computer system 14, decreasing the server capacity available for other applications.

Additionally, agent software system 36 in the system of FIG. 1 is dependent upon manager software 34 in at least two senses. First, knowledge must be transmitted by manager 34 to agent 36 when manager 34 desires to begin monitoring resources on server computer system 14, resulting in a large flurry of network traffic. Second, if no manager or console process exists to support agent software system 36, then resources on server computer system 14 will go un-monitored.

Another class of network management systems have been implemented according to the well-known Simple Network Management Protocol (hereinafter "SNMP") as described, for example, in Marshall T. Rose, *The Simple Book* (2d ed., PTR Prentice-Hall, Inc., 1994). The SNMP protocol specifies that only one agent will exist on a given managed node in a network regardless of the number of console processes interested in monitoring the resources associated with the node. The SNMP protocol is designed such that a set of information called a Management Information Base (hereinafter "MIB") will be locally available in storage for each such agent in the network. The MIB acts to define the objects, or resources, that can be monitored using the SNMP protocol. In operation, an SNMP agent will monitor objects associated with its node in accordance with the information comprising the MIB independently of the existence of a console process interested in the objects. However, an SNMP system is inefficient and inflexible in that a console must request information from the agent about objects on a piecemeal basis, one request per piece of information, causing increased network traffic as well as overhead in the computer system running the console.

Yet another problem with network management systems has been inefficient or nonexistent means used to manage events occurring within the network, resulting in difficulty in coordinating recovery actions between the various management consoles throughout the network.

It is therefore an object of the present invention to provide an enterprise management system that will increase automation and efficiency in network management and decrease the complexity of such management.

It is another object of the present invention to provide an enterprise management system that is easy to implement and maintain as installed applications and computers change.

It is another object of the present invention to provide an agent system for use in an enterprise management system wherein the agent system utilizes the memory and CPU resources of a server computer system in an efficient manner, regardless of the number of console systems that are monitoring the resources on the server.

It is another object of the present invention to provide an enterprise management system that decreases the amount of network traffic associated with communication between agent processes and console processes.

It is another object of the present invention to provide an enterprise management system that enables the management of events in a network to be coordinated between the various console processes in the network.

It is another object of the present invention to provide an agent system for use in an enterprise management system wherein the agent system is autonomous and capable of monitoring and managing the resources on a server computer system regardless of whether a console system in the network is monitoring resources on the server.

Other objects and advantages of the present invention will be apparent to persons having ordinary skill in the art and having reference to the following specification and drawings.

SUMMARY OF THE INVENTION

The invention is an improved method and software system for monitoring and managing applications and other resources in a computer network. The method and system is preferably to be used in any distributed computing environment in which two or more computer systems are connected by a network, including environments in which the networked computers are of different types. At least one manager software system is installed on and runs on at least one of the networked computer systems designated as a network management computer system. The network management computer systems act as consoles for monitoring and managing resources present on server computer systems in the network. An agent software system is installed on and runs on each of the server computer systems in the network. Each respective agent software system carries out tasks on the computer system in which it is installed such as discovering which resources and applications are present on the computer system, monitoring particular aspects of the resources and applications present on the computer system, and executing recovery actions automatically when such actions are warranted. Each agent is also able to carry on a dialog of communication with manager software systems via the network, so that the consoles on the network management computer systems can provide a continuously updated display representing all resources and applications present throughout the network as well as the state of each such resource or application.

Knowledge modules are stored locally at the site of each server system on which an agent process is to run. Consoles register with the agents, telling the agents which resources, parameters and events the console is interested in receiving information about. In response, the agent loads only those knowledge modules into its knowledge database as are necessary to provide the monitoring services required by the consoles' registrations.

In operation, the agent then continually monitors the state of each resource registered to be monitored, as well as the state of certain default resources that are always to be monitored, and maintains a historical log both of events that have occurred and also of the values of individual parameters relevant to the resources. The agent also sends messages to each console registered to receive information; but the agent only sends information that each console is interested in receiving based on the console's registration information, thus reducing network traffic.

The enterprise management system of the invention also provides a unique event management capability. When a console sends a message to an agent indicating that the console's user has acknowledged the occurrence of an event, the agent modifies its event log accordingly, identifying which console acknowledged the event. The agent then propagates a message to all other consoles in the network that are registered with the agent to receive infomation about the affected resource. Recipient consoles modify their own event caches in response to the agent's message, with the result that all consoles in the network are automatically updated and coordinated regarding attempts to handle an event.

When the last console registered with an agent to receive information about a non-default resource sends a message to the agent un-registering itself, the agent unloads from its knowledge database the knowledge that was being used to provide information to the console. In this manner, server memory and CPU resources are more efficiently utilized.

The invention also comprises using an agent as an intermediary in a large-scale enterprise whereby the agent acts as a collector, concentrating event information flowing from lower-level agents for ultimate use by a higher level console. In such a multi-tiered arrangement, true scalability is achieved.

BRIEF DESCRIPTION OF THE DRAWINGS

FIG. 4 is a diagrammatic illustration of the types of information that are stored in a knowledge module according to the network management system of FIG. 1.

FIG. 5a and 5b comprise a listing of portions of an actual knowledge module according to the network management system of FIG. 1.

FIG. 6a and 6b comprise a listing of portions of an actual script program according to the network management system of FIG. 1.

FIG. 15 is an illustration of preferred data structures for implementing an event repository for storage in an agent computer system as well as in a manager computer system according to the invention.

FIG. 17 is an illustration of a preferred data structure for implementing a table of registered consoles for storage in an agent computer system according to the invention.

FIG. 19 is a flow diagram illustrating a preferred procedure for registering a console with an agent and dynamically loading knowledge modules according to the invention.

FIG. 22 is an illustration of a preferred data structure for implementing an event filter according to the invention.

FIG. 23 is an illustration showing an example of how two event filters can form a filter chain according to the invention.

FIG. 25 is a pseudo-code listing disclosing a preferred event processing routine for use in the procedure of FIG. 24.

FIG. 26 is a flow diagram illustrating a preferred procedure for managing events in an enterprise management system according to the invention.

FIG. 27b is a block diagram illustrating a preferred procedure for implementing the configuration of FIG. 27a.

DETAILED DESCRIPTION OF THE INVENTION

The invention will now be described in detail with reference FIGS. 11–26, like numbers being used therein to indicate corresponding components.

General Implementation

The general implementation of the invention will now be discussed with reference to FIGS. 11–15.

Figure 1:
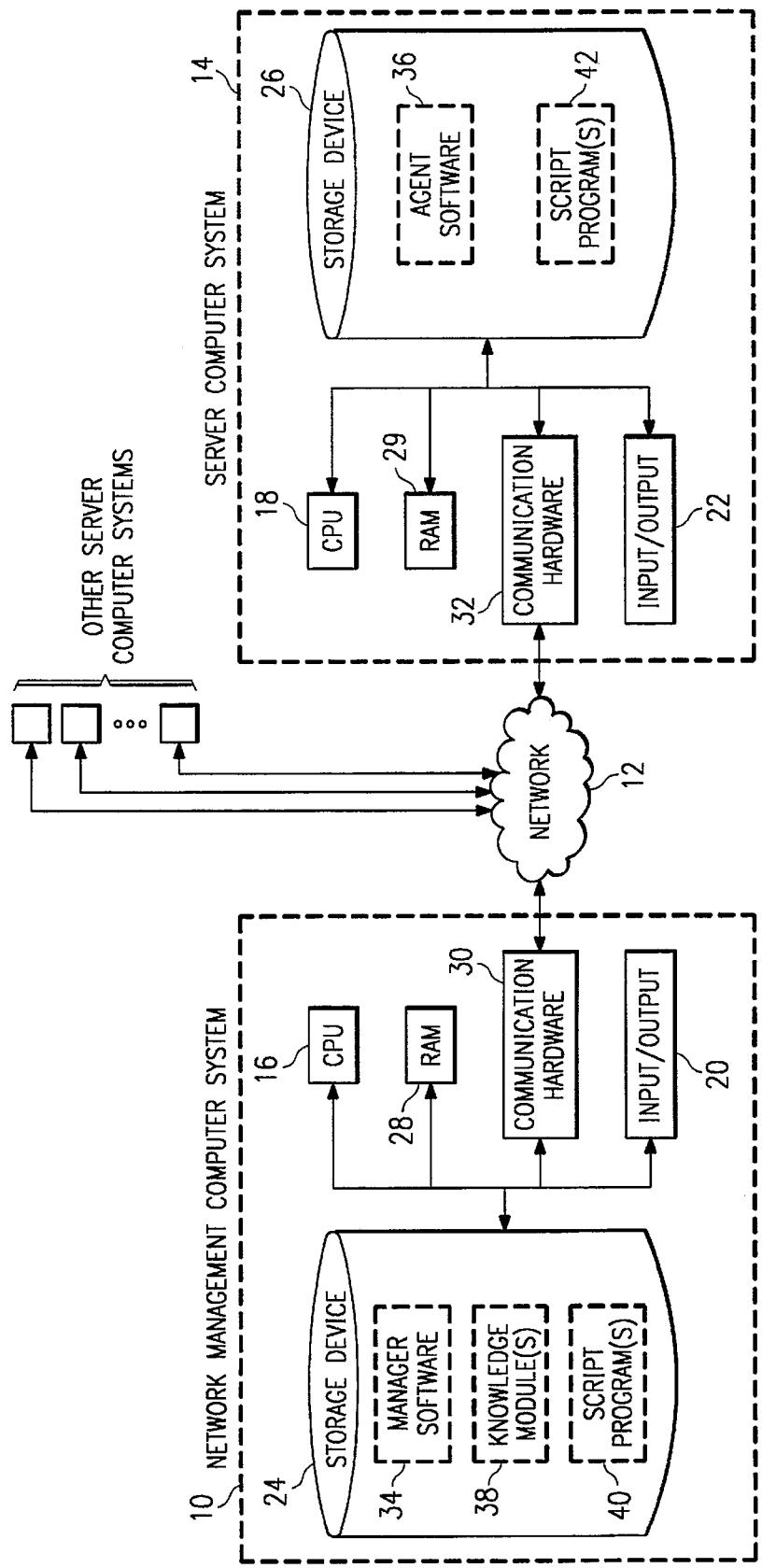
FIG. 1 is a block diagram of a computer network configured to implement a network management system.
Figure 2:
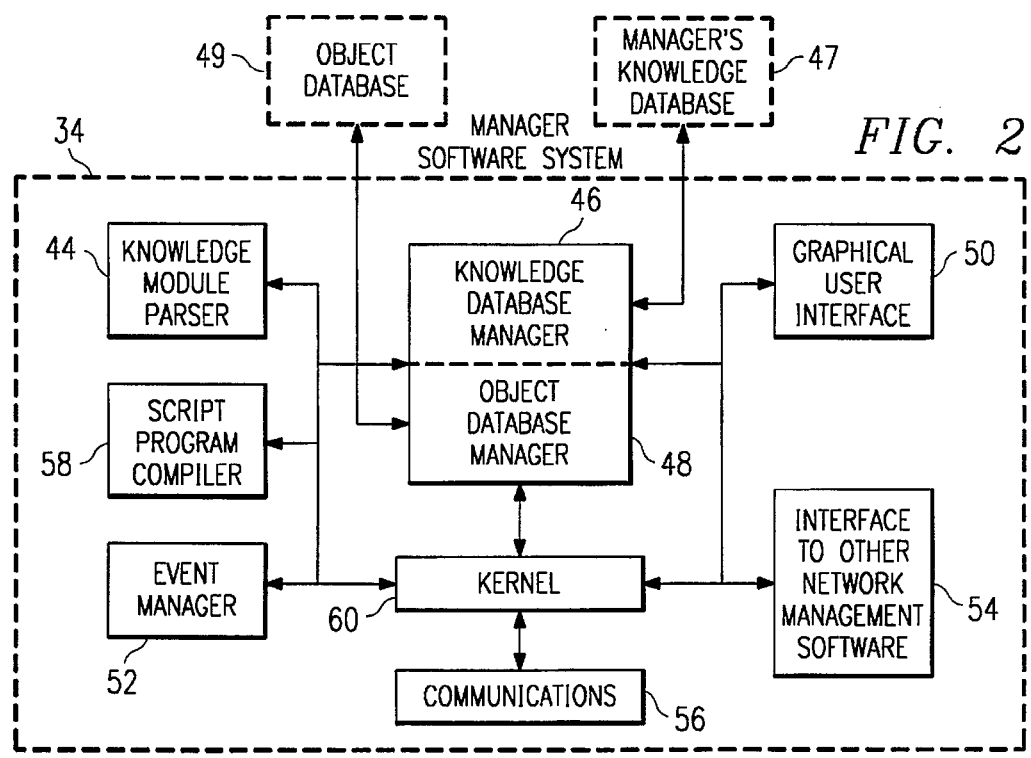
FIG. 2 is a block diagram showing the main components of the manager software system of FIG. 1.
Figure 3:
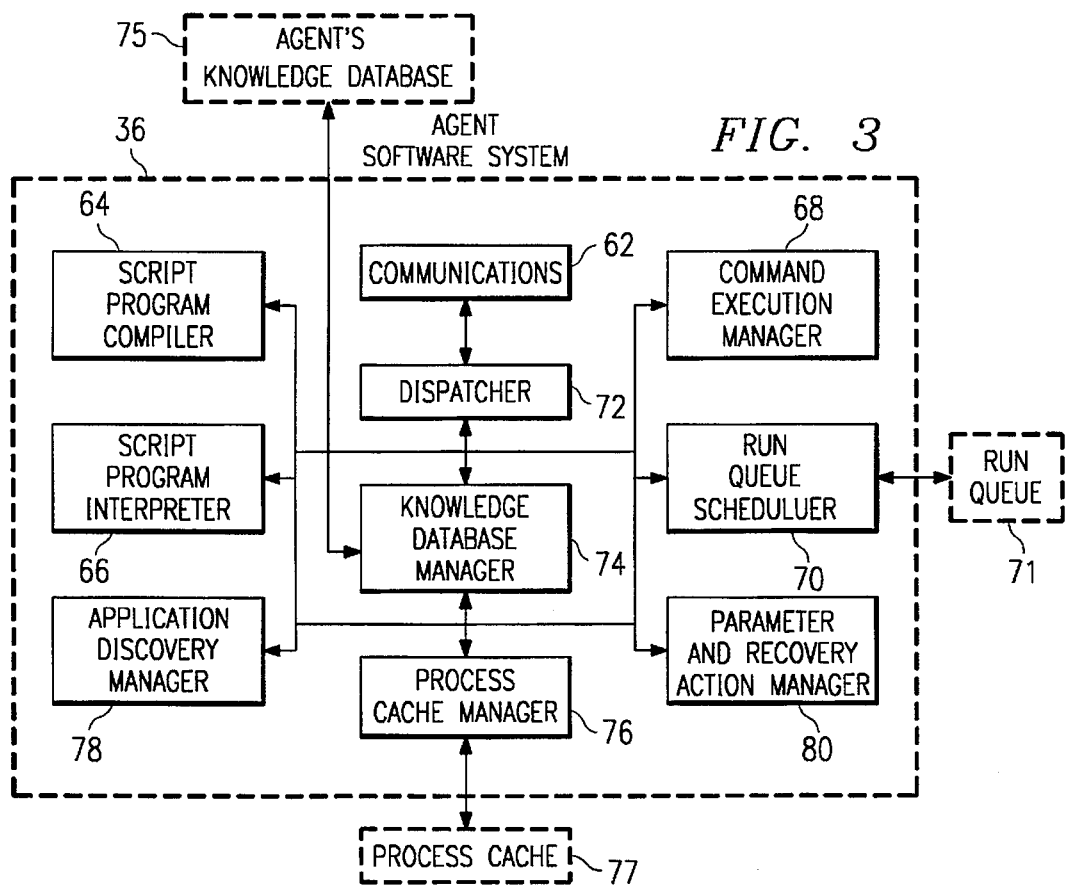
FIG. 3 is a block diagram showing the main components of the agent software system of FIG. 1.
Figure 7:
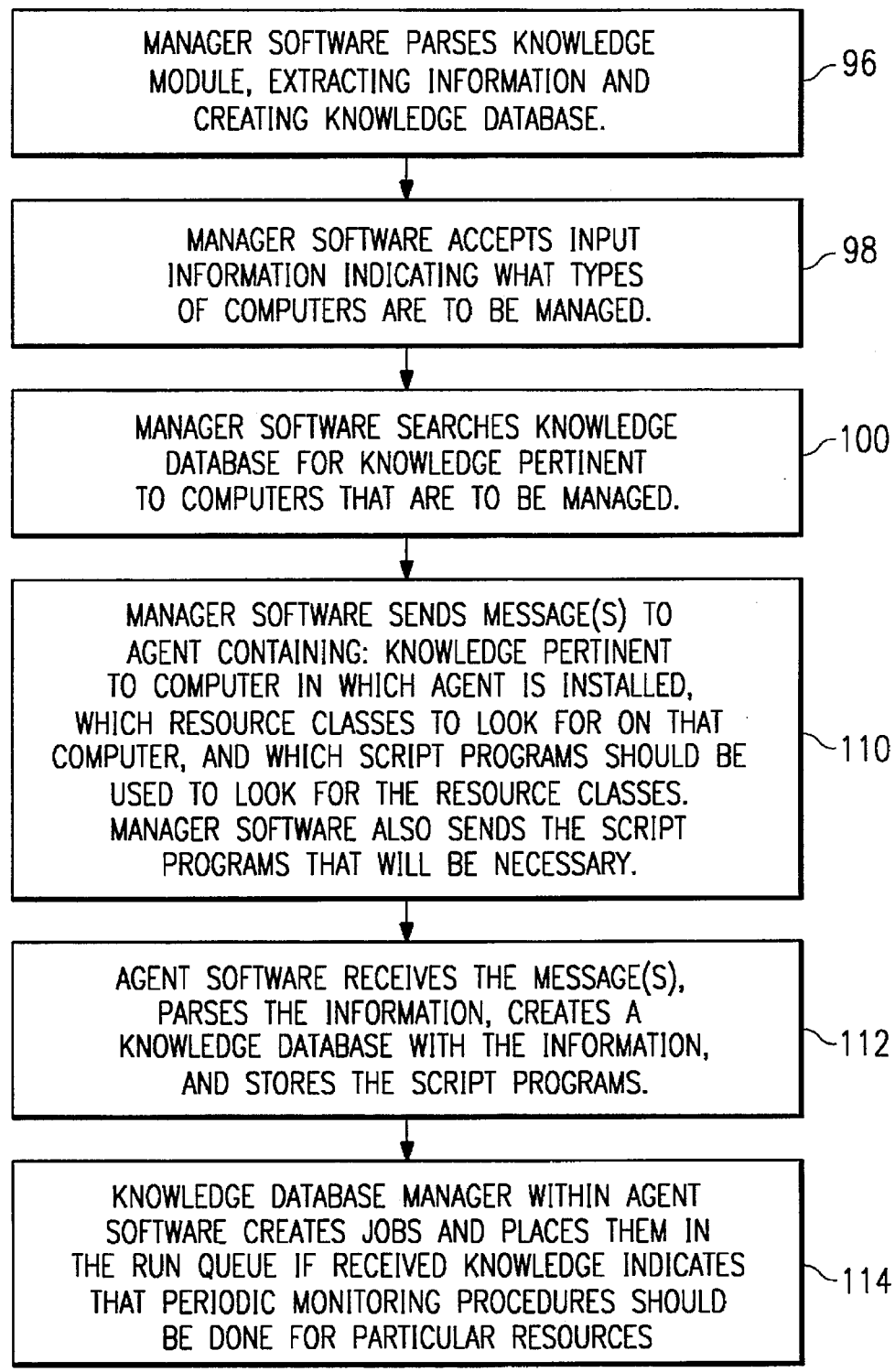
FIG. 7 is a flow diagram illustrating a procedure for initializing a network for operation according to the network management system of FIG. 1.
Figure 8:
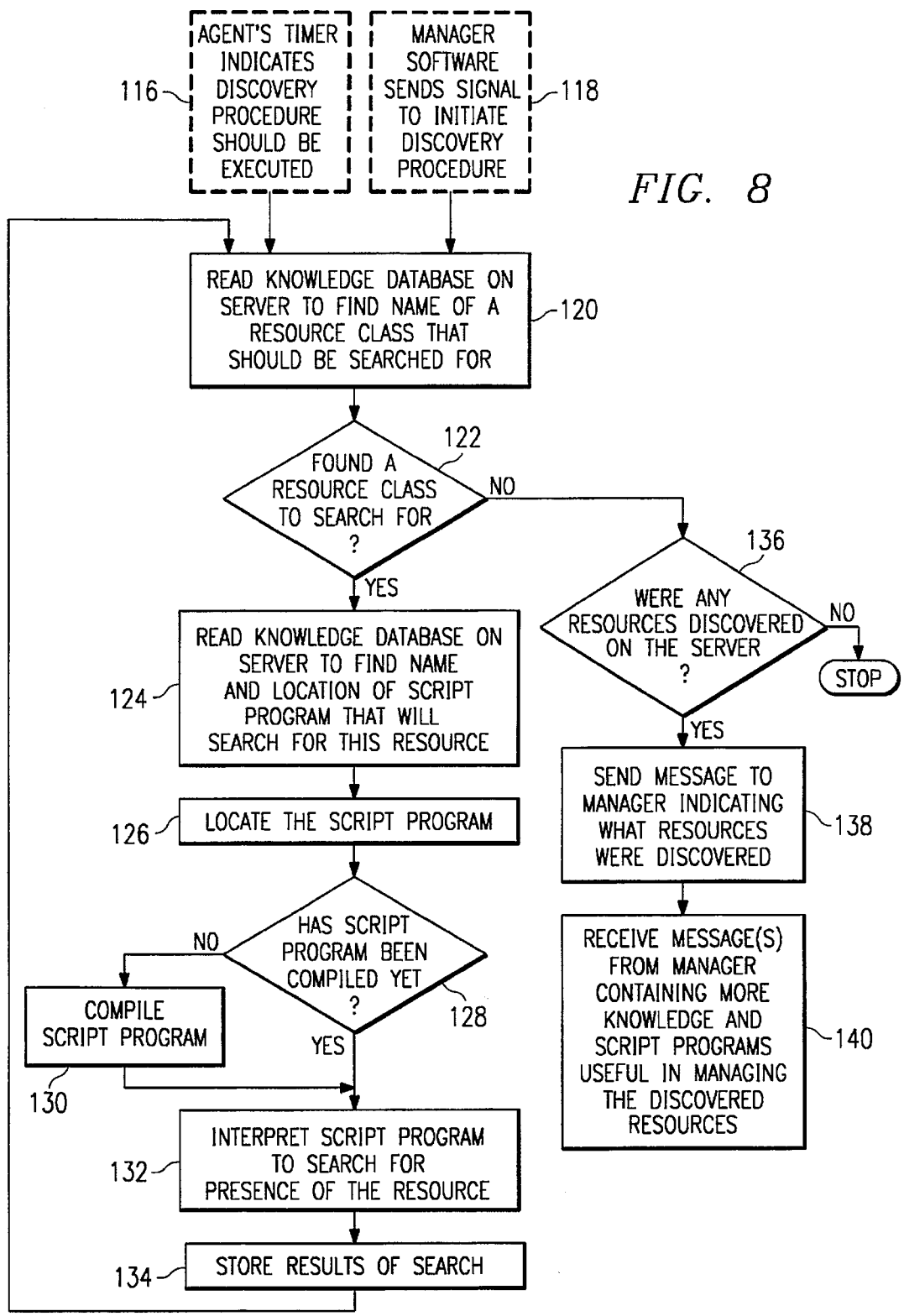
FIG. 8 is a flow diagram illustrating a procedure for discovering resources according to the network management system of FIG. 1.
Figure 9:
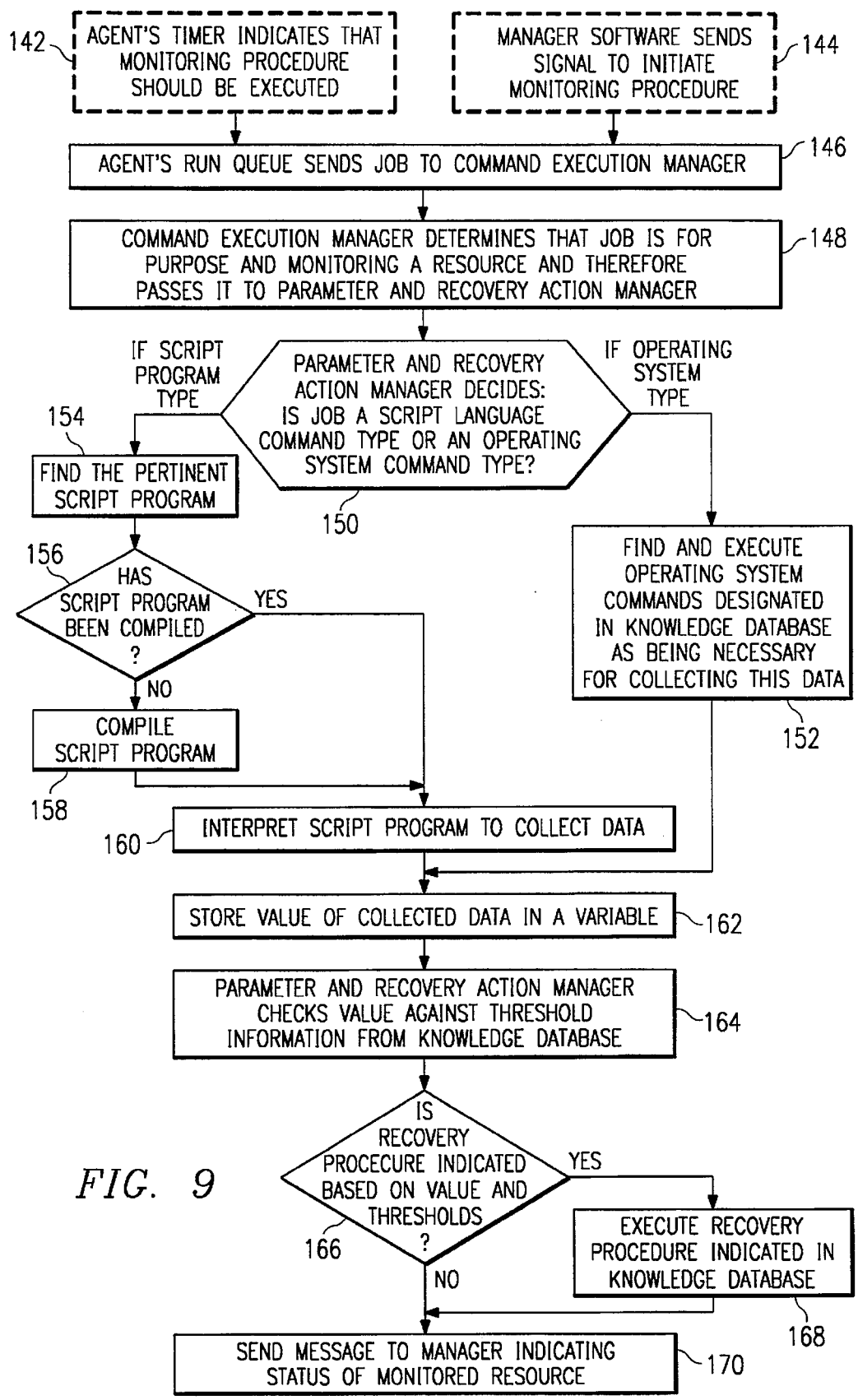
FIG. 9 is a flow diagram illustrating a procedure for monitoring resources according to the network management system of FIG. 1.
Figure 10:
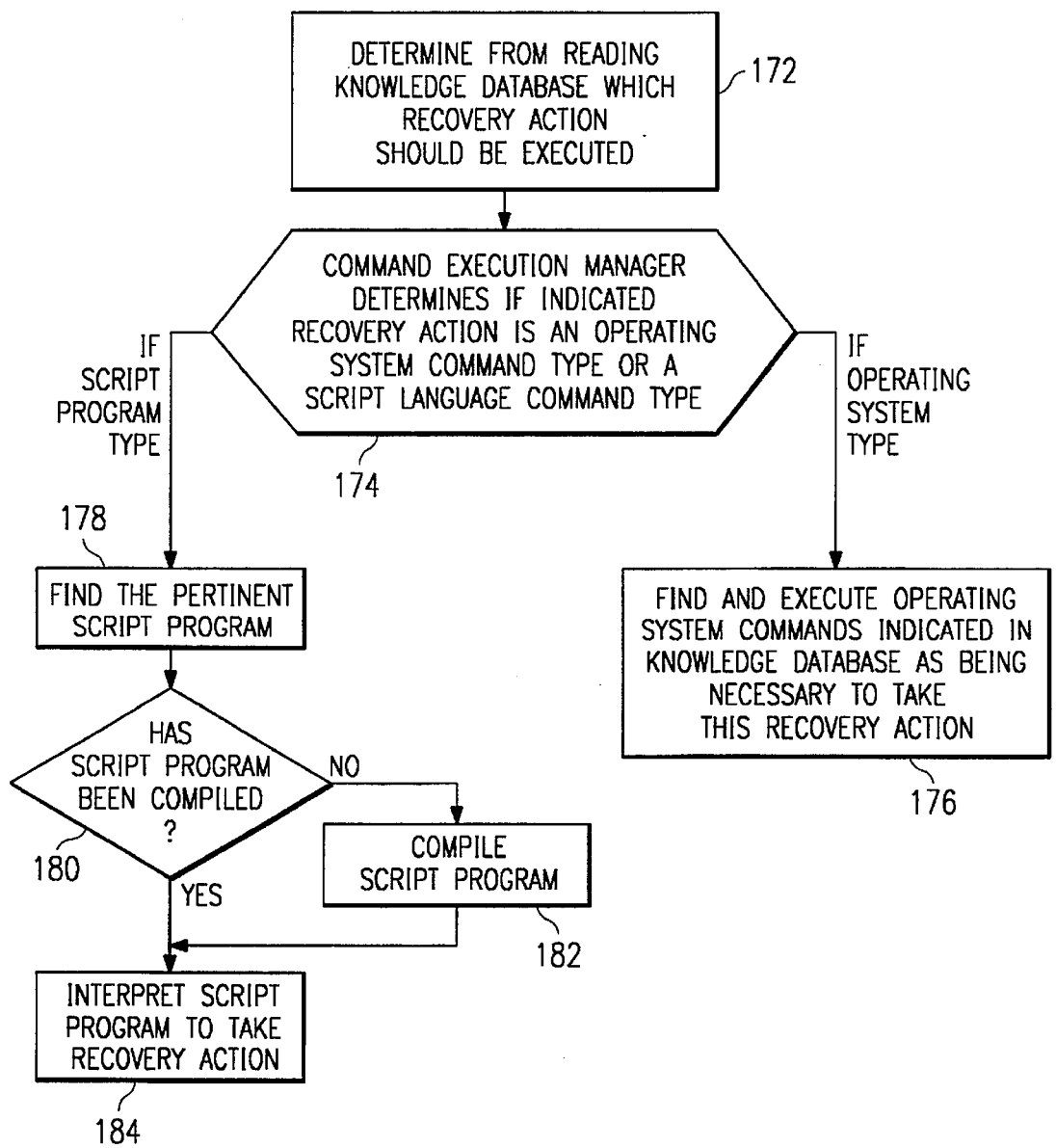
FIG. 10 is a flow diagram illustrating a procedure for executing recovery actions according to the network management system of FIG. 1.
Figure 11:
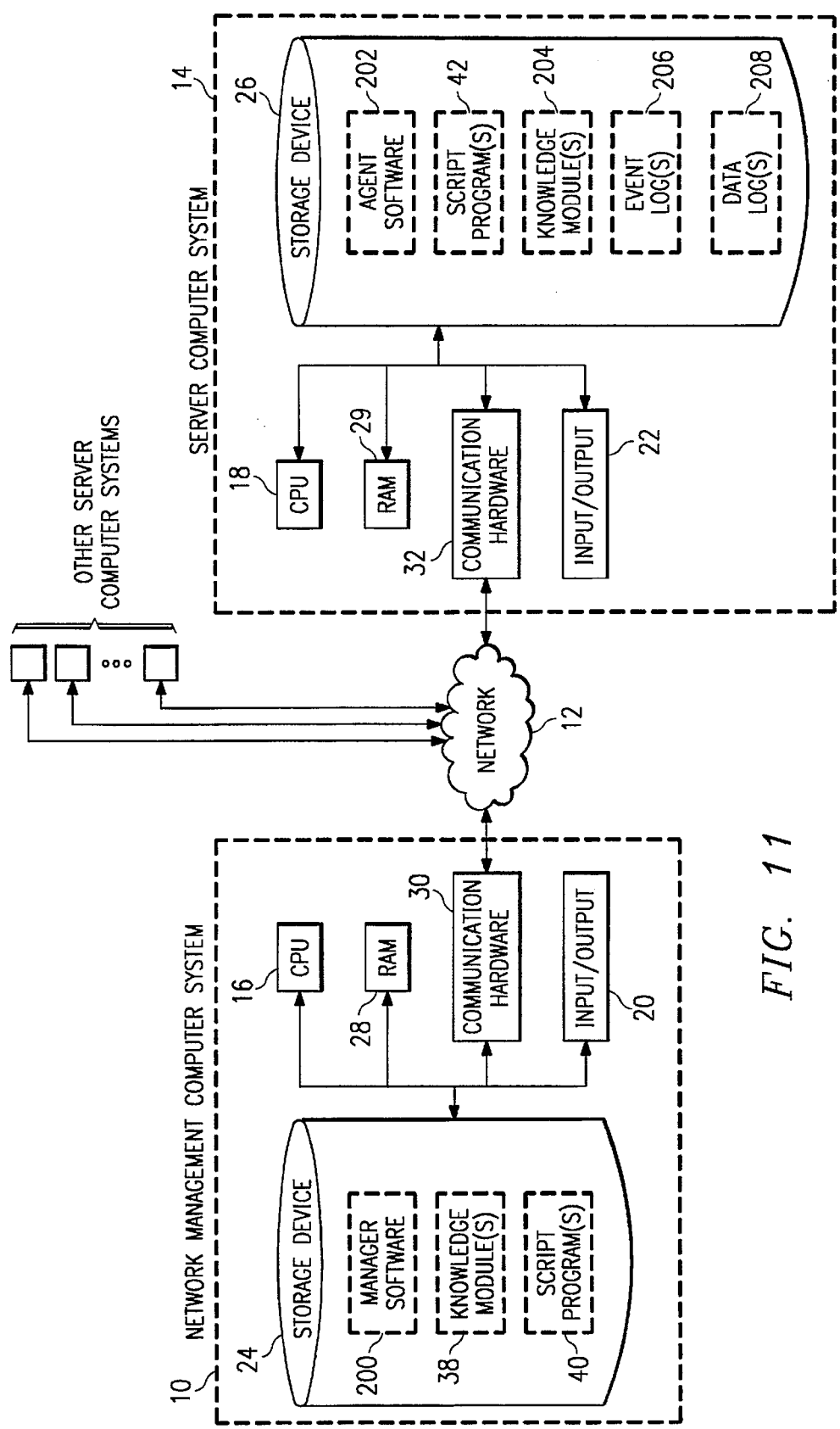
FIG. 11 is a block diagram illustrating a computer network configured to implement an enterprise management system according to a preferred embodiment of the invention.

FIG. 11 is a block diagram showing a computer network configured to implement a preferred embodiment of the invention. As can be seen from the diagram, much of the configuration is similar to that of FIG. 1. Manager software 200 and agent software 202 differ, however, from their counterparts in the system of FIG. 1. They differ in that they are enhanced to perform the functionality that will be described in more detail below in relation to the other drawings. There are also three additional components shown in the network of FIG. 11 that are not shown in FIG. 1. First, knowledge modules 204 are stored locally at the site of the server computer systems 14. Second, agent software 202 creates an event log 206 (also called an "event repository" herein) to be further described below. Third, agent software 202 creates a data log 208 (also called a "data repository" herein), also to be further described below.

Figure 12:
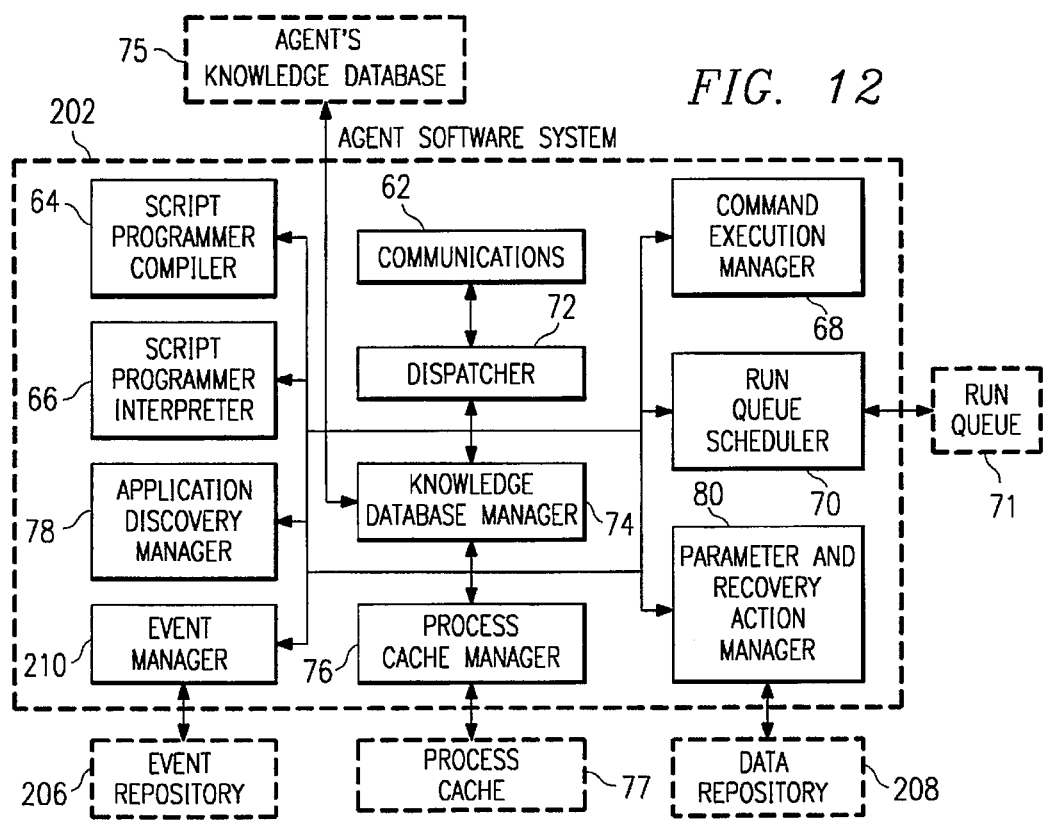
FIG. 12 is a block diagram illustrating the main components of a preferred agent software system according to the invention.

FIG. 12 is a block diagram showing the main components of a preferred embodiment of agent software system 202. As can be seen, many of the components correspond to those in agent software system 36. However, the overall functionality of agent software system 202 is enhanced relative to that of agent software system 36, so as to perform the functionality to be further described below. Also, agent software system 202 includes an event manager 210. The functionality of event manager 210 will be discussed in more detail below in reference to other drawings.

Figure 13:
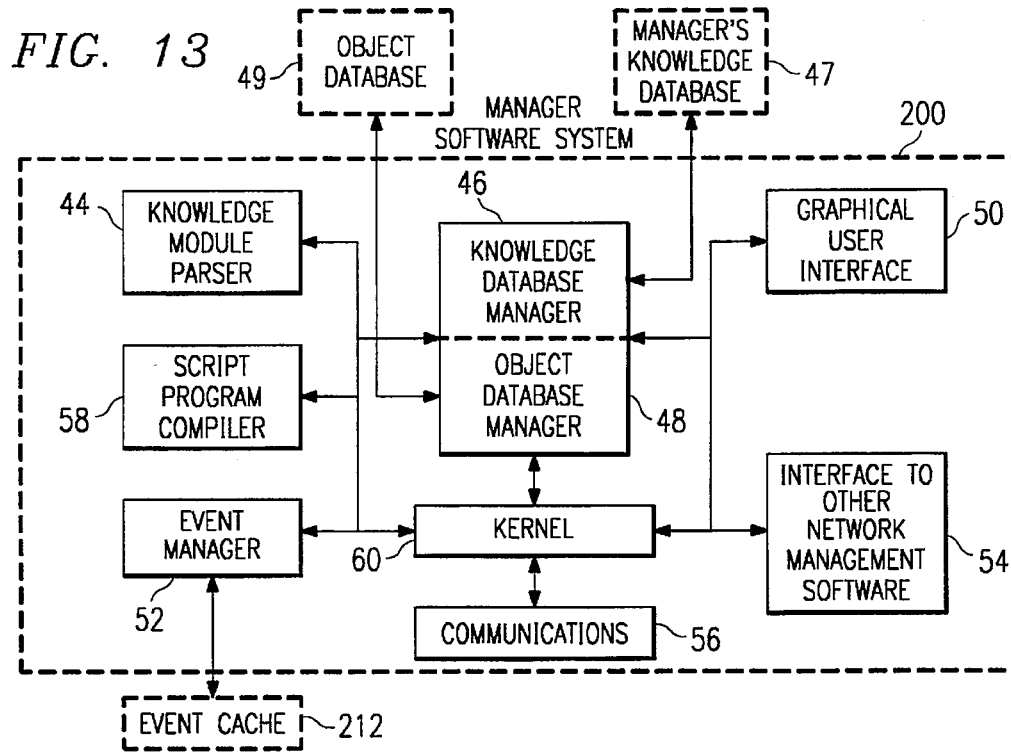
FIG. 13 is a block diagram illustrating the main components of a preferred manager software system according to the invention.

FIG. 13 is a block diagram showing the main components of a preferred embodiment of manager software system 200. As can be seen, many of the components correspond to those in manager software system 34. However, the overall functionality of manager software system 200 is enhanced relative to that of manager software system 34, so as to perform the console registration and event management functionality to be further described below. Also, manager software system 200 creates an event cache 212 whose structure is identical to that of event repository 206 to be described below.

Figures 14, 16:
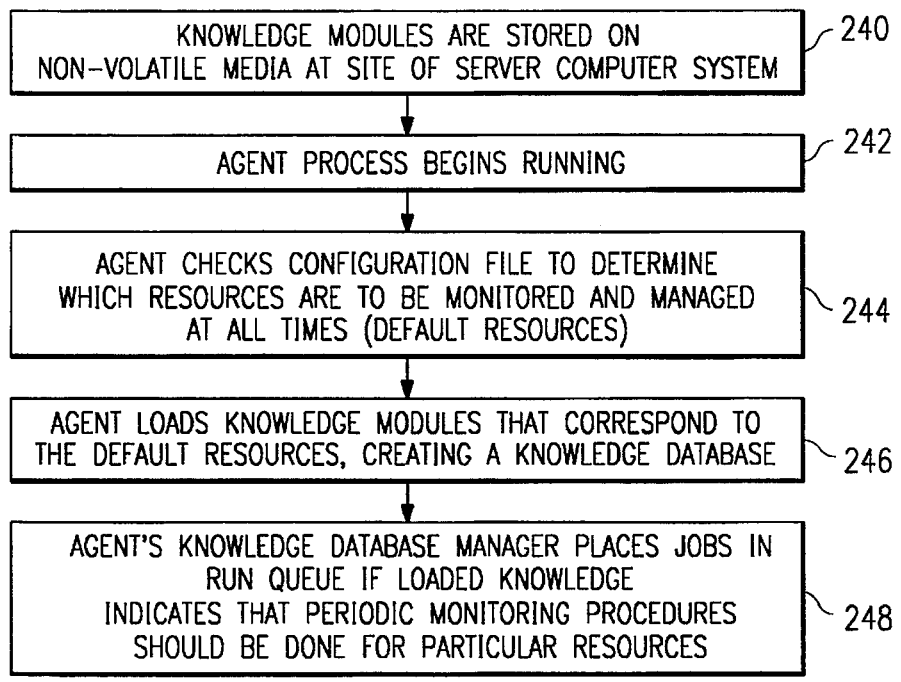
FIG. 14 is an illustration of a preferred data structure for implementing a data repository for storage in an agent computer system according to the invention.
FIG. 16 is a flow diagram illustrating a preferred procedure for initializing an agent software system according to the invention.

FIG. 14 shows a preferred data structure for agent software 202 to use for storing historical application parameter values and related information in non-volatile memory, such as on storage device 26. The structure comprises a data repository 208. Within the records stored in data repository 208, there are several fields. Parameter identification field 214 contains a unique identifier for the parameter, including the associated application name, instance name and parameter name. Measurement time field 216 contains an indication of the time at which the value of the parameter was measured. Value field 218 contains the calculated value of the parameter. In a preferred embodiment, the logging of data into data repository 208 by agent 202 can be enabled or disabled by means of a flag. Preferably, data repository 208 is a circular disk file such that the structure will grow to a limited number of records, at which point new entries will cause the oldest records in the file to be overwritten.

FIG. 15 shows a preferred set of data structure for agent software 202 to use for storing historical information about events that have occurred. A series of event catalogs 220–24 are provided. Such event catalogs, as can be seen from the diagram, contain a series of enumerated records, each such record containing an event description. An event repository 206 is also provided. Within the records comprising event repository 206, there are a number of fields. Catalog number field 226 contains a reference identifying which of the event catalogs contains a description of the recorded event. Entry number field 228 contains the record or entry number of the event description in the catalog pointed to by field 226. Event argument field 230 contains variable information that can be associated with fixed information associated with an event description. (The use of such argument fields facilitates the use of multilingual implementations, such that the same numerical argument may be inserted into descriptions of an event written in several different languages.) Event status field 232 contains information such as whether the event is "open," "closed," "acknowledged" or "deleted." Event time field 234 records the time at which the event was generated or detected. Event diary field 236 may contain textual information about an event. The textual information may be entered manually by a user or automatically by agent 202. Event owner field 238 is used to record an identifier for the user or console that has acknowledged the event. Preferably, event repository 206 is stored as a circular disk file.

Initialization of the Agent

FIG. 16 is a flow diagram illustrating a preferred procedure for initializing agent 202. In step 240, knowledge modules are stored at the site of agent 202 in non-volatile memory, such as in storage device 26. In step 242, agent software 202 begins executing. In step 244, agent software 202 checks a configuration file, also preferably stored on storage device 26, indicating which resources or applications on the server are to be monitored always, regardless of whether or not a console has registered interest in the application (such applications are hereinafter called "default resources"). In step 246, agent 202 loads, from storage device 26 into knowledge database 75, only the knowledge modules that correspond to the default applications. In step 248, agent 202 initializes run queue 71 so that the default applications will be monitored periodically according to the information and instructions contained in the loaded knowledge modules.

Console Registration and De-Registration with Dynamic Loading and Unloading of Knowledge Modules FIG. 17 illustrates a preferred data structure for agent 202 to use in storing registration information about consoles that register with the agent according to the registration procedure that will be discussed in more detail below. As can be seen, each record or entry in the structure contains a number of fields. Entry number field 252 is mainly shown in the drawing for illustrative purposes to number the records indicated in the drawing. Address field 254 is used to contain information that will identify the console registered, such as the network address of the console. Event context field 256 is used to point to a list of event filters associated with the registered console. (A list of event filters is referred to hereinbelow as a "filter chain," and is described below in relation to FIG. 22 and 23.) By way of example, in the diagram, console A is registered at entry number 0 in the table, and is associated with event context A. Console B, on the other hand, is registered an entry number 1 in the table, and is associated with event context B. The table should preferably be able to hold a large number of entries, so that an equally large number of managers 200 may register to receive information from agent 202.

Figure 18:
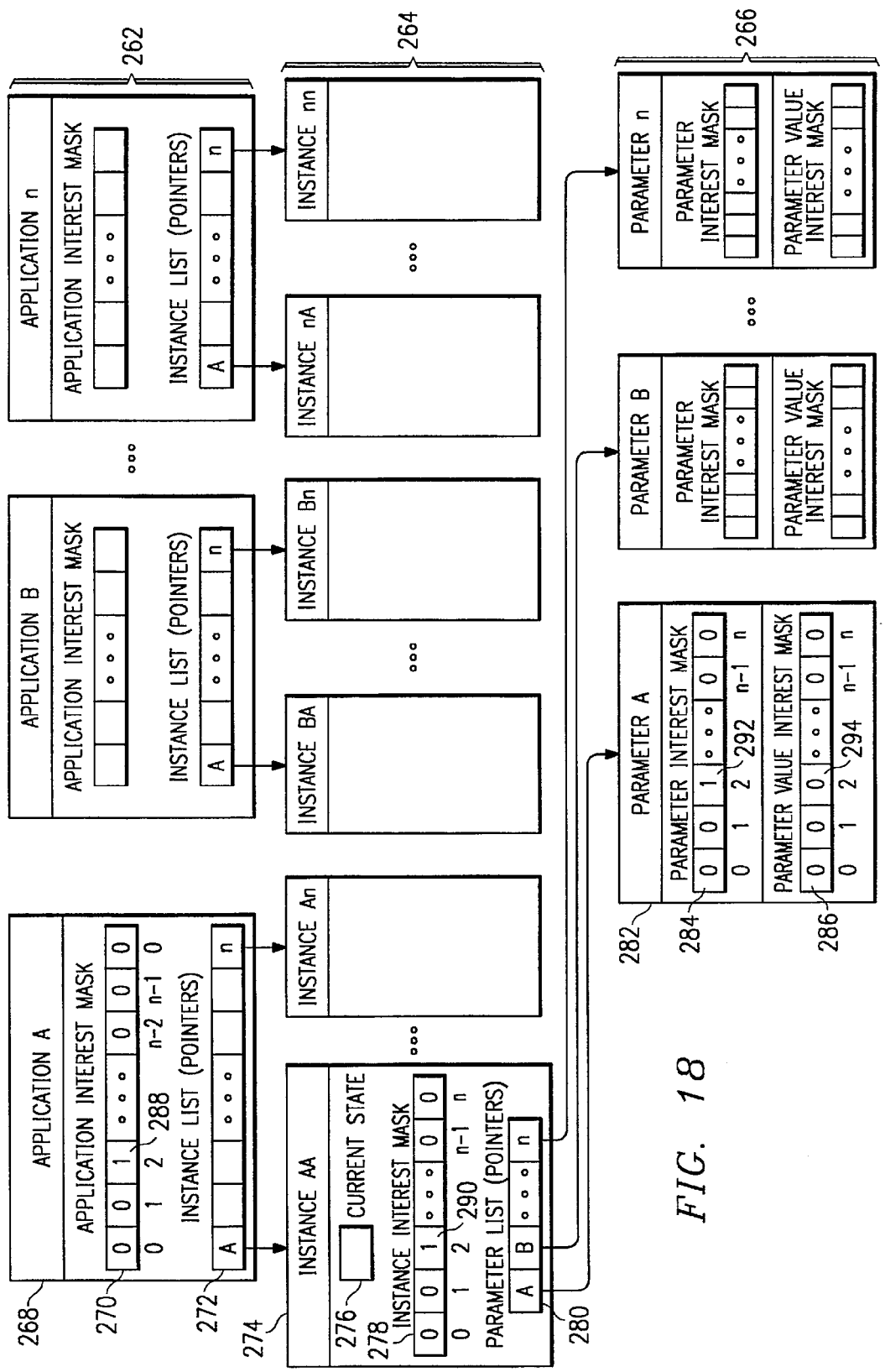
FIG. 18 is an illustration of preferred data structures for implementing a series of interest masks for storage in an agent computer system according to the invention.

FIG. 18 illustrates a preferred set of data structures for agent 202 to use in determining which consoles should receive various types of available information, according to a procedure which will be further discussed below. The diagram shows three basic types of data structures: application-level structures 262, instance-level structures 264, and parameter-level structures 266. It will be understood that all structures on each respective level are intended to be the same as the other structures shown on the same level. The structures on application level 262, such as structure 268 corresponding to Application A, comprise an application interest mask 270 and an instance list 272. Preferably, application interest mask 270 is a bit field, and instance list 272 is a list of pointers to corresponding instance-level structures. The structures on instance level 264 comprise a current state field 276 for storing the current state of an application instance (for example, "instance is shut down" or "instance is active"), an instance interest mask 278, and an instance list 280. Preferably, instance interest mask 278 is a bit field and parameter list 272 is a list of pointers to corresponding parameter-level structures. The structures on parameter level 266 comprise a parameter instance mask 284 and a parameter value interest mask 286. Preferably, both parameter instance mask 284 and parameter value interest mask 286 are bit fields.

The purpose of the above-referenced interest masks are to associate all of the information necessary to determine whether a given registered console is "interested" in receiving information corresponding to the object that owns the interest mask. The preferred association technique is that the bit number in the various interest mask bit field corresponds to the entry number in table 250 at which the console is registered. This technique is best explained by way of the following example: Referring to FIG. 17, it can be seen that console C has registered with agent 202, and its identifying information has been placed at entry number 2 in the table 250. Thus, the assertion level of the bit in position number 2 of each interest mask will indicate whether console C is interested in the information associated with the interest mask. In FIG. 18, it can be seen at location 288 that console C is registered to receive information about application A because the bit in location 288 is asserted. At location 290, it can be seen that console C is also registered to receive information about instance AA of application A. At location 292, it can be seen that console C is also registered to receive information about events associated with parameter A of instance AA of application A. At location 294, however, it can be seen that console C is not registered to receive the value of parameter A each time the parameter is calculated (elsewhere herein referred to as "real-time" parameter monitoring) because the bit in location 294 is unasserted.

FIG. 19 is a flow diagram illustrating a preferred procedure by which a console 200 may register with an agent 202. In step 296, the console sends a message to the agent identifying itself. In step 298, the agent responds to the console's message, identifying itself in return. In step 300, the console sends a registration message to the agent. The registration message preferably contains a list of application classes and instances in which the console is interested. (The message may alternatively include a list of instances in which the console is specifically not interested.) The agent then makes appropriate entries in the interest masks discussed in relation to FIG. 18 in order to reflect the registering console's requests. Preferably, the agent assigns the same values to parameter interest masks as it assigns to associated instance interest masks. (Non-identical assignments could be desirable, however, in alternative implementations in which the console sends other registration information in addition to the above-described registration information, such as a list of parameters the console is interested in.) In step 302, the agent is shown making the appropriate entries in the data structures discussed above in relation to FIG. 17 and 18, so as to store the registration information and to associate it with the console's identifier.

The console could also send an event filter or set of chained event filters for storage in the agent. If the console does not send an event filter, however, the agent simply assigns the "default" event filter to the console's event context. The default filter is a PASS type filter with a wild-card in each of the event source, event type and event severity condition fields. (Event filters are described in more detail below.)

Figure 20:
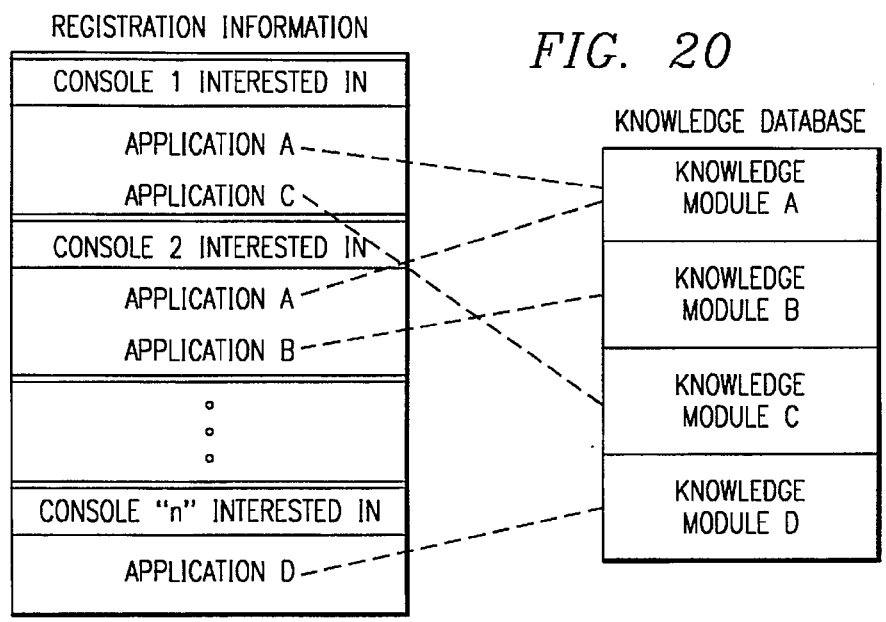
FIG. 20 is a schematic representation of the dynamic loading of knowledge modules in an agent computer system according to the invention as a result of the registration of numerous consoles with the agent.

In steps 304 and 306, the agent determines which knowledge modules will be required in the agent's knowledge database 75 in order to service the requests of the registered console. The agent then proceeds to load the requisite knowledge modules. However, the agent will not re-load knowledge modules that are already present in knowledge database 75, thus avoiding redundancy. This process results in dynamic loading of knowledge modules, which is illustrated schematically in FIG. 20. In FIG. 20, it can be seen by way of example that, according to the registration information received in the registration process of FIG. 19, console 1 is interested in applications A and C, console 2 is interested in applications A and B, and console "n" is interested only in application D. Thus, only four knowledge modules are needed in knowledge database 75, knowledge modules corresponding to applications A, B, C and D. Therefore, only those knowledge modules are loaded. (Of course, other knowledge modules may be present in knowledge modules 75 as well, such as those associated with "default" applications.)

Figure 21:
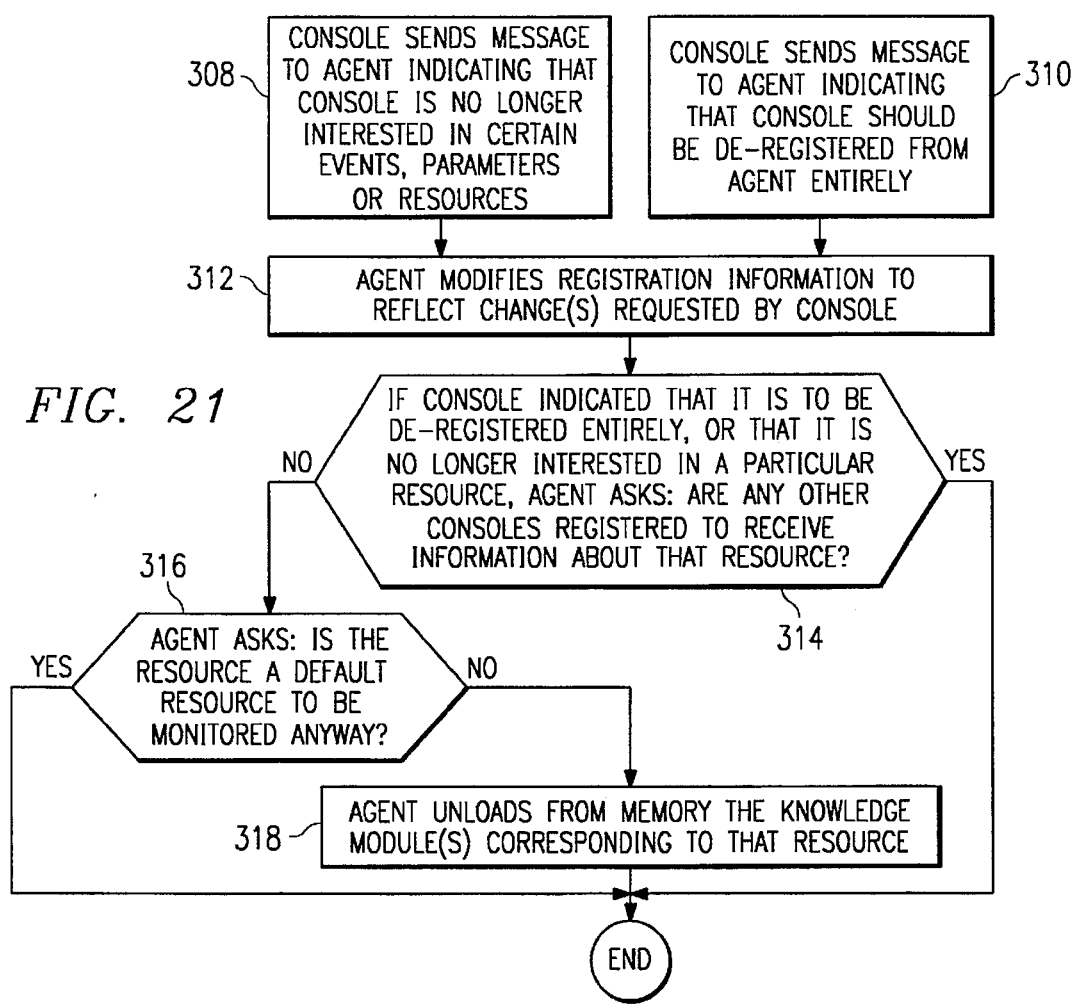
FIG. 21 is a flow diagram illustrating a preferred procedure for de-registering a console from an agent according to the invention and dynamically unloading knowledge modules.

FIG. 21 is a flow diagram illustrating a preferred procedure for de-registering a console from an agent either partially or completely. The procedure may be initiated in a number of ways. Typically, it will be initiated when a console sends a message changing its registration information, as in step 308, or indicating that it should be de-registered from the agent completely, as in step 310. In step 312, the agent modifies the data structures of FIG. 17 and 18 accordingly to make the necessary change in registration information, or to delete the necessary information. For example, to de-register a console entirely, the agent would delete the console's entry from table 250.

In steps 314, 316 and 318, the agent determines whether one or more knowledge modules stored in knowledge database 75 have become superfluous as a result of the change in console registration. If so, the superfluous knowledge modules are unloaded from knowledge database 75, thus making more efficient use of server resources.

Resource Monitoring and Data Reporting with Event Filtering

Event filtering allows a console interested in a particular object to be selective about the events it wants to be notified about in relation to the object.

FIG. 22 illustrates a preferred data structure for implementing event filtering. Event filter structure 320 includes four fields. Field 322 determines whether the event filter is a PASS type filter or a FAIL type filter. Field 324 may contain information identifying events by the name of an object of list of objects potential causing the event. For example, field 324 might contain an application name, instance name or parameter name. Field 326 may contain infomation identifying events by type, such as a state-change event or error event. Field 328 may contain information identifying events by severity level, such as alarm severity, warning severity, or simply information-level severity. Fields 324, 326 and 328 may also contain wild-card characters.

Filtering may be explained by way of example with reference to FIG. 23. FIG. 23 illustrates a sequence of two "chained" filters, filters A and B. These two filters are designed such that if all events generated were tested against filter A first and then filter B, the result would be that all events would pass through filter A, but any events of the type having an infomation-level severity would be screened an would not pass through filter B. In other words, all events having a severity level higher than the information level of severity would pass through both event filters and be recognized.

A preferred procedure for monitoring resources, processing events and reporting data to consoles will now be discussed in relation to FIG. 24 and 25.

Figure 24:
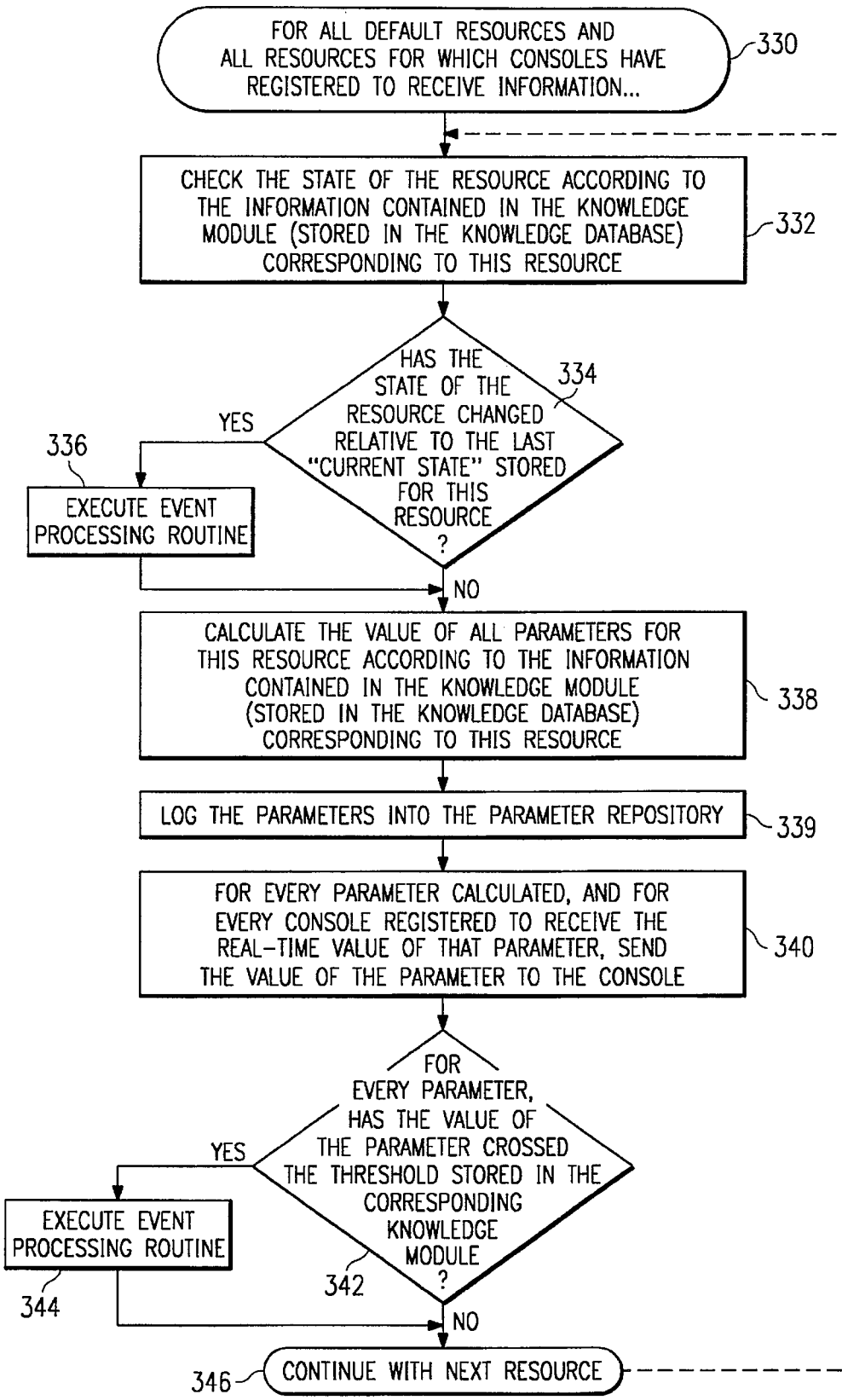
FIG. 24 is a flow diagram illustrating a preferred procedure to be used by an agent for monitoring resources, checking for event occurrences, and for filtering and communicating the results to consoles according to the invention.

As can be seen in step 330, FIG. 24 is a loop that is repeated for each resource that the agent is supposed to monitor pursuant to the default list of resources found in the configuration file during agent initialization and pursuant to the registration infomation received and stored from registering consoles as described above. In step 332, the agent checks the state of the resource. In step 334, the agent determines whether the state of the resource has changed relative to the information stored, for example, in field 276. If the state has changed, the agent continues with step 336, in which it executes the event processing routine of FIG. 25 (to be discussed below). If not, the agent continues with step 338, in which it calculates the value of the parameters associated with this resource. In step 339, the parameter values are stored in the data structure described in FIG. 14. In step 340, the agent sends the calculated parameter values to all consoles registered to receive "real-time" data for that instance and parameter. In step 342, the agent compares the value of every parameter against a threshold (usually stored in a knowledge module) to determine if a threshold-crossing event has occurred. If so, then the agent continues with step 344, in which it executes the event processing routing of FIG. 25. If not, the agent arrives at step 346 and repeats the loop by returning to step 330 if more resources are to be monitored.

FIG. 25 is a pseudo-code listing for illustrating a preferred procedure for processing events. It will be understood that the pseudo-code is shown for purposes of explanation only, and that persons of ordinary skill in the art may program the routine differently while still remaining within the scope of the invention. Each time the routine is executed, a record of the event is logged into event repository 206. Then, two nested loops are executed. The outermost loop repeats for all consoles registered in table 250. The innermost loop repeats for all event filters in the chain of filters identified by the event context information stored in field 256 of table 250 for each registered console. The effect of the routine is that events are only reported to interested consoles, and even then only to interested consoles whose event filters are satisfied by the event. This procedure provides enhanced performance by, among other things, reducing network traffic.

Event Management

FIG. 26 is a flow diagram illustrating a preferred procedure for managing events in an enterprise management system like that of FIG. 11. It will be understood that the procedure of FIG. 26 would begin after the event processing routing of FIG. 25 sent a message to a console notifying the console that an event has occurred, and after the user at the console decided to take responsibility for handling the reported event. In step 348, after the user taking responsibility for the event makes an appropriate entry at his console, the console sends a message to the agent so indicating. In step 350, the agent modifies event repository 206 accordingly. For example, the agent would modify field 238 to identify the console or the user taking responsibility for the event. The agent might also modify field 232 indicating that the status of the event is "acknowledged." In step 352, the agent uses the data structures of FI6. 17 and 18 to send a message to every console interested in this event. Such a message would include, for example, an indication of the fact that a console has taken responsibility for the event, and an indication of the identity of the responsible console. It will be understood that all other information pertinent to the event may also be sent in such a message according to procedures already described above. In step 354, the consoles receiving a message sent by the agent in step 352 modify the entries in their own event caches 212. The result of the procedure is that the information maintained in the agent's event repository is propagated throughout the network to all interested consoles, such that the event management efforts of all interested consoles will be automatically coordinated, and such that all such consoles will have access to the same, up-to-date information about the events that interest them.

Multi-Tiered Problem Management

Figure 27A:
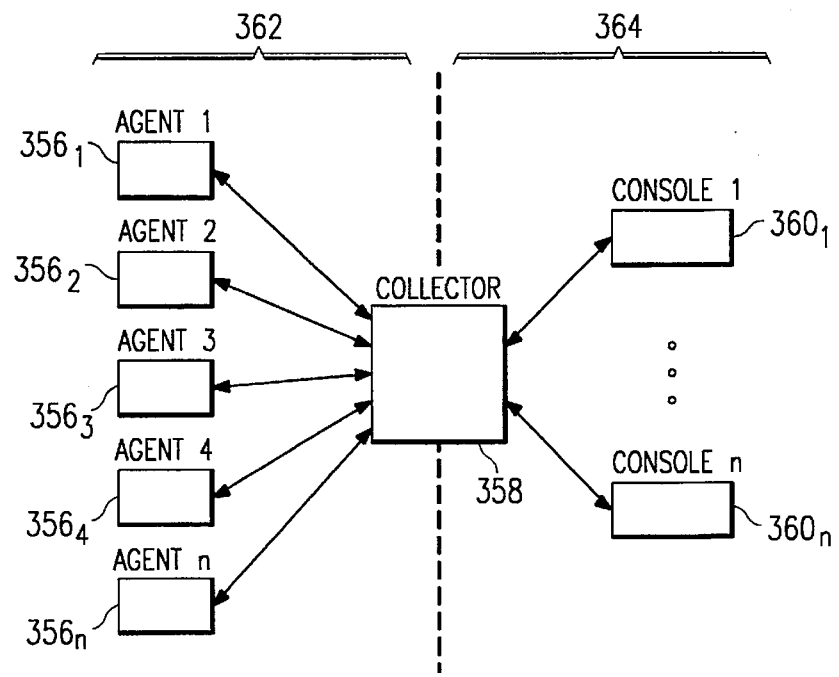
FIG. 27a is a top view block diagram illustrating an alternative embodiment of the invention configured to yield multi-tiered problem management capabilities in a large-scale enterprise.
Figure 27B:
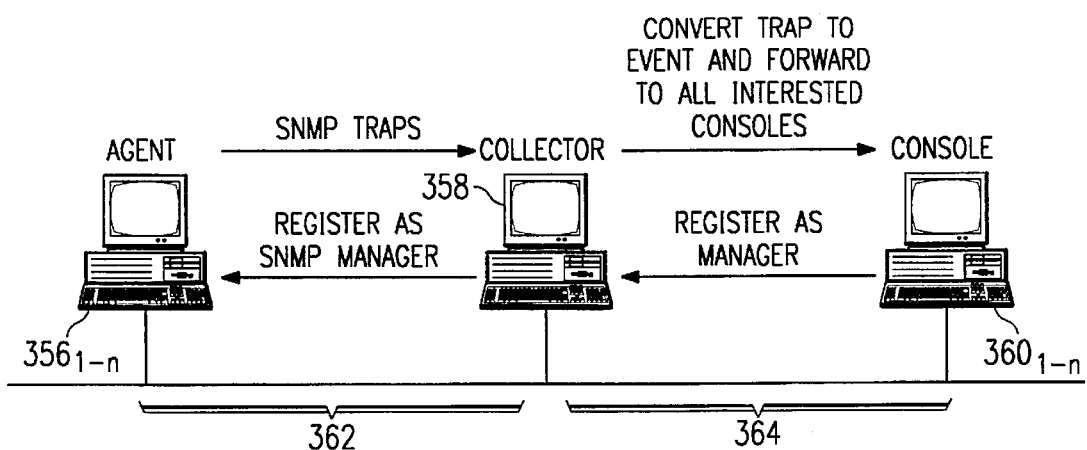

FIG. 27A and 27B comprise a block diagram illustrating an alternative embodiment of the invention, configured to yield multi-tiered problem monitoring and management capabilities in a large-scale enterprise. In such a configuration, the network is effectively divided into two or more tiers, such as tiers 362 and 364. It is to be understood that agent 356 in the drawing represents a multitude of other similar agents operating in tier 362 in the network. Collector 358 may be a single intermediary agent, or it may be viewed for purposes of the illustration as representing a number of such intermediate agents operating between tiers of a network, such as between tiers 362 and 364. The effect of the configuration is to reduce event-related network traffic on the higher tiers of the network, and also to remove some of the load of event management from higher level consoles. In operation, collector 358 registers with agents 356 as an SNMP manager and therefore begins to receive notification of SNMP traps. Collector 358 then converts the SNMP traps into an event recognizable by console 360, and collector 358 simultaneously acts as an agent 202 with respect to console 360. (Persons having ordinary skill in the art will readily understand that script programs and knowledge modules such as those discussed above may be used to accomplish this result without undue experimentation.) In this manner, collector 358 serves to lessen the burden of problem management placed on higher-level consoles such as console 360. The embodiment of the invention shown in FIG. 27 is very flexible. For example, as is indicated in the drawing, if console 360 desires "real-time" parameter data in addition to simply the event-related information coming from collector 358, then console 360 may also register with agents 356 independently.

Conclusion

While the invention is susceptible to various modifications and alternate forms, specific embodiments have been shown and described in a manner sufficient to enable persons having ordinary skill to utilize the invention in practice without undue experimentation. It will be understood, of course, that the invention is not limited to the particular forms disclosed, but rather is to cover all modifications, equivalents and alternatives falling within the spirit and scope of the of the invention as defined by the following claims.

What is claimed is:

1. A method for monitoring and managing computer system resources and applications in a computer network utilizing at least one console system and at least one agent system, said at least one console and at least one agent systems each comprising a random access memory and a non-volatile data storage device, the method comprising the steps of:

(a) storing, in the non-volatile data storage device, a plurality of data sets corresponding to information for monitoring and managing a plurality of resources and applications;

(b) transmitting a first request from the at least one console system to the at least one agent system, said first request specifying a first resource or application for the at least one agent system to monitor or manage;

(c) determining whether a first data set corresponding to information for monitoring or managing said first resource or application already exists in the random access memory of the at least one agent system;

(d) if the outcome of step (c) indicates that said first data set does not exist in the random access memory of the at least one agent system, loading said first data set from the non-volatile data storage device into the random access memory of the at least one agent system;

(e) gathering information about said first resource or application responsive to the information contained in said first data set;

(f) determining, responsive to a stored threshold and to information gathered in step (e), whether an event has occurred and, if so, what type of event;

(g) transmitting a plurality of messages, from the at least one agent system to the at least one console system, said plurality of messages containing information about said first resource or application;

(h) transmitting a second request from the at least one console system to the at least one agent system, said second request specifying that the at least one console system should not receive information about said first resource or application;

(i) determining whether other of the at least one console systems should receive information about said first resource or application;

(j) if the outcome of step (i) indicates that no other of the at least one console systems should receive information about said first resource or application, unloading said first data set from the random access memory of the at least one agent system.

2. The method of claim 1 wherein said application portion of said first request includes information identifying a type of computer application.

3. The method of claim 2 wherein said first request further includes information identifying an instance within the class of instances defined by said type of computer application.

4. The method of claim 3 wherein said first request further includes information identifying a first event pertinent to said instance.

5. The method of claim 4, further including the step of excluding, from said plurality of messages, any information about events that are detected in step (f) but that do not correspond to said first event.

6. The method of claim 1, further including the step of storing, in the non-volatile data storage device of the at least one agent system, a first record of information gathered in step (e) and events detected in step (f).

7. The method of claim 6 wherein, for cases in which said plurality of messages contains information indicating that said first event has occurred and in which the at least one console system wishes to communicate to other of the at least one console systems that the at least one console system has learned of the occurrence of said first event, the method further including the steps of:

transmitting a third request, from the at least one console system to the at least one agent system, said third request containing an acknowledgment that said first event has occurred;

storing a second record of said acknowledgment that said first event has occurred in the non-volatile data storage device of the at least one agent system;

determining whether other of the at least one console systems in the network should receive notification of said acknowledgment that said first event has occurred; and, if so, transmitting a fourth request to at least one other console system in the network, said fourth request containing information about said acknowledgment that said first event has occurred.

8. The method of claim 1 wherein the at least one console system runs on a first computer system and the at least one agent system runs on a second computer system.

9. The method of claim 1 wherein the at least one agent system executes recovery actions responsive to events detected in step (f), said recovery actions specified by information contained in said first data set.

10. The method of claim 1 wherein said first data set contains information specifying computer script programs for discovering, monitoring or managing said first resource or application.

11. A method for monitoring and managing computer system resources and applications utilizing at least one agent system, said agent system comprising a random access memory and a non-volatile data storage device, the method comprising the steps of:

a) storing, in the non-volatile data storage device, a plurality of data sets corresponding to information for monitoring and managing a plurality of computer resources and applications;

b) storing, in the non-volatile data storage device, information indicating which computer resources or applications are to be monitored or managed by the at least one agent system;

c) reading said information indicating which of said computer resources or applications are to be monitored or managed by the at least one agent system;

d) responsive to information read in step (c), loading, into the random access memory, a first data set corresponding to a first computer resource or application to be monitored or managed by the at least one agent system;

e) gathering information about said first computer resource or application responsive to information contained in said first data set;

f) determining, responsive to a stored threshold and to information gathered in step (e), whether an event has occurred and, if so, what type of event; and g) storing, in the random access memory, information gathered in step (e) or information corresponding to events detected in step (f).

12. The method of claim 11 further including the steps of:

(h) responsive to information read in step (c), determining whether a second data set corresponding to information for monitoring and managing a second computer resource or application already exists in the random access memory of the at least one agent system;

(i) if the outcome of step (h) indicates that said second data set does not exist in the random access memory of the at least one agent system, loading said second data set from the non-volatile data storage device into the random access memory of the at least one agent system;

(j) gathering information about said second computer resource or application responsive to information contained in said second data set;

(k) determining, responsive to a stored threshold and to information gathered in step (j), whether an event has occurred, and if so, what type of event; and (l) storing, in the random access memory, information gathered in step (j) or information corresponding to events detected in step (k).

13. The method of claim 11 wherein a plurality of data sets corresponding to a plurality of computer resources or applications to be monitored or managed by the at least one agent system are loaded into the random access memory of the at least one agent system.

14. The method of claim 11 wherein said first data set contains information specifying computer script programs for discovering, monitoring or managing said first computer resource or application.

15. The method of claim 11 further including the step of storing, in the non-volatile data storage device, information gathered in step (e) or information corresponding to events detected in step (f).

16. The method of claim 11 further including the step of executing recovery actions responsive to events detected in step (f), said recovery actions specified by information contained in said first data set.

17. The method of claim 11 wherein information about said first computer resource or application is gathered automatically according to a predetermined time schedule.

18. The method of claim 11 further including at least one console system, said console system including a random access memory and a non-volatile data storage device, the method further comprising the steps of:

h) transmitting a first request from the at least one console system to the at least one agent system, said first request specifying a second computer resource or application for the at least one agent system to monitor or manage;

i) determining whether a second data set corresponding to information for monitoring or managing said second computer resource or application already exists in the random access memory of the at least one agent system;

j) if the outcome of step (i) indicates that said second data set does not exist in the random access memory of the at least one agent system, loading said second data set from the non-volatile data storage device of the at least one agent system into the random access memory of the at least one agent system;

k) gathering information about said second computer resource or application responsive to information contained in said second data set;

l) determining, responsive to a stored threshold and to information gathered in step (k), whether an event has occurred and, if so, what type of event;

m) transmitting a plurality of messages, from the at least one agent system to the at least one console system, said plurality of messages containing information about said second computer resource or application;

n) transmitting a second request from the at least one console system to the at least one agent system, said second request specifying that the at least one console system should not receive information about said second computer resource or application;

o) determining whether other of the at least one console systems should receive information about said second computer resource or application; and p) if the outcome of step (o) indicates that no other of the at least one console systems should receive information about said second computer resource or application, unloading said second data set from the random access memory of the at least one agent system.

19. The method of claim 18 further including the step of executing recovery actions responsive to events detected in step (1), said recovery actions specified by information contained in said data sets.

20. The method of claim 11 further including at least one console system, said console system including a random access memory and a non-volatile data storage device, the method further including the step of transmitting information gathered about said first computer resource or application to the at least one console system.

21. A method for monitoring and managing computer system resources and applications utilizing at least one agent system, at least one intermediate agent system, and at least one console system, where the at least one agent system, intermediate agent system and console system each comprise a random access memory and a non-volatile data storage device, the method comprising the steps of:

(a) registering the at least one intermediate agent system with the at least one agent system, said registration specifying resources and applications for the at least one agent system to monitor or manage;

(b) registering the at least one console system with the at least one intermediate agent system, said registration specifying resources and applications for the at least one intermediate agent system to monitor or manage;

(c) gathering, by the at least one agent system, information about said resources and applications monitored or managed by the at least one agent system;

(d) determining by the at least one agent system, responsive to registration information received from the at least one intermediate agent system, whether the at least one intermediate agent system should receive information about said resources and applications monitored or managed by the at least one agent system;

(e) responsive to the outcome of step (d), transmitting a plurality of messages from the at least one agent system to the at least one intermediate agent system, said plurality of messages containing information about said resources and applications monitored or managed by the at least one agent system;

(f) determining by the at least one intermediate agent system, responsive to registration information received from the at least one console system, whether the at least one console system should receive information about said resources and applications monitored or managed by the at least one intermediate agent system;

(g) responsive to the outcome of step (f), transmitting a plurality of messages from the at least one intermediate agent system to the at least one console system, said plurality of messages containing information about said resources and applications monitored or managed by the at least one intermediate agent system.

22. The method of claim 21 further including a plurality of intermediate agent systems, the method further including the steps of:

(h) registering other of the plurality of intermediate agent systems with the at least one intermediate agent system, said registration specifying resources and applications for the at least one intermediate agent system to monitor or manage;

(i) determining by the at least one intermediate agent system, whether other of the plurality of intermediate agent systems should receive information about resources and applications monitored or managed by the at least one intermediate agent system;

(j) responsive to the outcome of step (i), transmitting a plurality of messages from the at least one intermediate agent system to other of the plurality of intermediate agent systems, said plurality of messages containing information about resources and applications monitored or managed by the at least one intermediate agent system.

23. The method of claim 21 further including the steps of:

(h) registering the at least one console system with the at least one agent system, said registration specifying resources and applications for the at least one agent system to monitor or manage;

(i) determining by the at least one agent system, whether the at least one console system should receive information about resources and applications monitored or managed by the at least one agent system;

(j) responsive to the outcome of step (i), transmitting a plurality of messages from the at least one agent system to the at least one console system, said plurality of messages containing information about resources and applications monitored or managed by the at least one agent system.

24. The method of claim 21 further including the steps of:

(h) de-registering the at least one console system from the at least one intermediate agent system;

(i) de-registering the at least one intermediate agent system from the at least one agent system.

25. The method of claim 21 wherein at least one intermediate agent system is used to interface between a plurality of tiers of a computer network including agent systems, intermediate agent systems or console systems.

26. The method of claim 21 wherein the at least one console system runs on a first computer system, the at least one intermediate agent system runs on a second computer system, and the at least one agent system runs on a third computer system.

27. The method of claim 21 wherein the registration information contains information specifying computer script programs for discovering, monitoring or managing said resources or applications.

* * * * *